US012575995B2

United States Patent
(12) United States Patent
Hara et al.

(10) Patent No.: US 12,575,995 B2
(45) Date of Patent: Mar. 17, 2026

(54) WEARABLE MOTION ASSISTANCE DEVICE

(71) Applicant: CYBERDYNE, Inc., Tsukuba (JP)

(72) Inventors: Hiromasa Hara, Tsukuba (JP); Masahiro Takama, Tsukuba (JP); Hiroki Watari, Tsukuba (JP)

(73) Assignee: CYBERDYNE Inc., Tsukuba (JP)

( * ) Notice: Subject to any disclaimer, the term of this patent is extended or adjusted under 35 U.S.C. 154(b) by 867 days.

(21) Appl. No.: 17/801,180

(22) PCT Filed: Feb. 9, 2021

(86) PCT No.: PCT/JP2021/004745
§ 371 (c)(1),
(2) Date: Nov. 11, 2022

(87) PCT Pub. No.: WO2021/166739
PCT Pub. Date: Aug. 26, 2021

(65) Prior Publication Data
US 2023/0270616 A1 Aug. 31, 2023

(30) Foreign Application Priority Data
Feb. 20, 2020 (JP) ................................ 2020-027617

(51) Int. Cl.
*A61H 3/00* (2006.01)

(52) U.S. Cl.
CPC ......... *A61H 3/00* (2013.01); *A61H 2201/165* (2013.01); *A61H 2201/5069* (2013.01); *A61H 2230/605* (2013.01)

(58) Field of Classification Search
CPC .. B25J 9/0006; A61H 3/00; A61H 2201/1215; A61H 2201/0107;
(Continued)

(56) References Cited

U.S. PATENT DOCUMENTS 9,370,439 B2 * 6/2016 Bédard ................. A61F 5/0125
11,103,369 B2 * 8/2021 Sankai ...................... A61F 2/72
(Continued)

FOREIGN PATENT DOCUMENTS

JP 2005-253650 A 9/2005
JP 2006-115971 A 5/2006
(Continued)

OTHER PUBLICATIONS

Patent Cooperation Treaty, International Search Report, Application No. PCT/JP2021/004745, dated Mar. 31, 2021, in 5 pages.
(Continued)

*Primary Examiner* — Brandy S Lee
*Assistant Examiner* — Rohan Patel
(74) *Attorney, Agent, or Firm* — Procopio, Cory, Hargreaves & Savitch LLP

(57) ABSTRACT

In a state where a drive unit is located on a lateral side of a joint(s) of a wearer wearing clothes and a communication unit and a frame unit are fixed and retained corresponding to the wearer's first and second body sites, respectively, a driving torque of an actuator according to movements of the wearer's joint is transmitted as an assist force to the first and second body sites without giving any physical burdens or hindrances in daily life to the wearer.

14 Claims, 30 Drawing Sheets

(58) Field of Classification Search
CPC .... A61H 2201/5069; A61H 2201/1463; A61H 2201/5007; A61H 1/0244; A61H 1/024; A61H 2201/165; A61H 1/0255; A61H 1/0277; A61H 2201/5058; A61H 2201/5023; A61H 2201/5046; A61H 2205/102; A61H 2201/164; A61F 5/00
See application file for complete search history.

(56) References Cited

U.S. PATENT DOCUMENTS

| | | | | |
|---|---|---|---|---|
| 2004/0102723 | A1* | 5/2004 | Horst | A61H 3/008 601/5 |
| 2006/0064047 | A1* | 3/2006 | Shimada | A61F 5/0102 602/26 |
| 2008/0161937 | A1 | 7/2008 | Sankai | |
| 2008/0234608 | A1 | 9/2008 | Sankai | |
| 2010/0160844 | A1* | 6/2010 | Gilbert | A61F 5/0102 602/16 |
| 2012/0259431 | A1* | 10/2012 | Han | A61H 1/024 623/24 |
| 2015/0081036 | A1* | 3/2015 | Nakanishi | A61H 1/0266 623/24 |
| 2017/0119550 | A1* | 5/2017 | Sankai | B25J 11/00 |
| 2017/0181917 | A1* | 6/2017 | Ohta | A61H 1/0281 |
| 2018/0296422 | A1* | 10/2018 | Sawicki | A61H 1/024 |
| 2019/0060156 | A1* | 2/2019 | Swift | A61H 1/00 |
| 2019/0254909 | A1* | 8/2019 | Lee | B25J 9/0006 |
| 2019/0328553 | A1 | 10/2019 | Sankai | |
| 2021/0085551 | A1* | 3/2021 | Gregg | A61H 3/00 |

FOREIGN PATENT DOCUMENTS

| | | | | |
|---|---|---|---|---|
| JP | 2006-204426 | A | | 8/2006 |
| JP | 2014054273 | | * | 3/2014 |
| JP | 2014054273 | A | * | 3/2014 |
| WO | 2018/092325 | A1 | | 5/2018 |

OTHER PUBLICATIONS

Extended European Search Report received in EP 21756769.2, dated Feb. 1, 2024, in 8 pages.

* cited by examiner (A)

(B)

(A)

(B)

(A) (B)

(A) (B) (C)

WEARABLE MOTION ASSISTANCE DEVICE

CROSS-REFERENCE TO RELATED APPLICATIONS

This application is US National Stage of International Patent Application PCT/CN2020/126621, filed Nov. 5, 2020, which claims benefit of priority from Chinese Patent Application CN201911307258.5, filed Dec. 18, 2019, the contents of both of which are incorporated herein by reference.

TECHNICAL FIELD

The present invention is suited for application to a wearable motion assistance device for assisting motions of, for example, a physically handicapped person who lost their muscular strength or an elderly person whose muscular strength has weakened, or for performing the motions on their behalf.

BACKGROUND ART

In Japan, we are facing super-aging society where an aging rate continues increasing regardless of the tendency of a reduction of total population in Japan; and the number of people who receive certifications of needed nursing care or needed supports as they age is increasing every year more rapidly than an increase in the number of elderly people.

Since an elderly person's physical functions decrease and their walking function deteriorates as they age, a fall-down risk increases. When the elderly person falls down, they may not die, but external injuries, particularly bone fractures, caused by the falling down will have a significant impact on the physical functions and cause a serious problem which may lead to a bedridden state or a state requiring nursing care.

It has been conventionally believed that maintenance and enhancement of the physical functions by physical exercise are effective in preventing the falling down; and it is reported that balance training including walking and augmentation of the muscular strength can have not only the fall-down prevention effect, but also the effect of reducing bone fractures caused by the falling down.

However, regarding walking of an elderly person, shuffling gait, a stride length reduction and its resultant reduction in a walking speed, a forward-bent walking posture, and so on tend to easily appear as characteristic gait due to lowering of the muscular strength and flexibility of their body trunk and lower limbs and they can easily stumble over, for example, even a slight difference in level. Therefore, it is believed to be important to realize a proper walking posture and reduce the fall-down risk by assisting the diminished physical functions of the elderly person.

In recent years, there have been a wide spread of various power assist devices for assisting motions of physically handicapped persons who lost their muscular strength or elderly persons whose muscular strength diminished, or for performing the motions on their behalf. As these power assist devices, for example, there has been proposed a wearable motion assistance device capable of controlling and assisting physical exercises on the basis of a bioelectric potential associated with voluntary muscular activities according to a wearer's intention (see, for example, PTL 1).

CITATION LIST

Patent Literature

PTL 1: Japanese Patent Application Laid-Open (Kokai) Publication No. 2005-253650

SUMMARY OF THE INVENTION

Problems to be Solved by the Invention

Meanwhile, as some elderly persons do not want to use a cane, it seems that there seem to exist many elderly persons who have strong psychological resistance to wearing the wearable motion assistance device. So, it is necessary to reduce the weight of the entire device in order to reduce the elderly person's physical burdens.

Also, assuming a case where an elderly person sits on a chair or ride a vehicle in order for them to go out or spend daily life, it is important to downsize an amount of protrusions from their body not only on their lateral sides, but on their back side. Therefore, it is desirable that the wearable motion assistance device should be made as small and thin as possible and be designed in a clothing form close to everyday clothes.

Furthermore, it is highly desirable that the wearable motion assistance device should be made to perform motions corresponding to various joint sites of the wearer's body, not only the wearer's walking motions, but also their upper limb motions and lower back part motions.

The present invention was devised in consideration of the above-described circumstances and proposes a wearable motion assistance device which is intended to achieve relatively light weight, downsizing, and thinning and can be made to perform motions by positioning the device at a desired joint site(s) of the wearer's body.

Means to Solve the Problems

In order to solve the above-described problems, there is provided according to the present invention a wearable motion assistance device including: a drive unit having first and second housings in which a stator side and a rotor side of an actuator are respectively housed and which engage with each other so that the first and second housings rotate separately according to driving of the actuator, wherein coupling parts of the same structure are formed to protrude from the first and second housings respectively in mutually opposite directions; first and second frame units that are respectively coupled to the respective coupling parts of the drive unit in a separable manner; a power source unit that engages with the first or second frame unit in a freely attachable/detachable manner and is equipped with a battery for supplying electric power to the actuator; a control unit provided in the drive unit and designed to perform drive control of the actuator; and a physical quantity detector that detects a physical quantity regarding a rotary motion between the first and second housings from a driving current supplied to the actuator; a biosignal detection unit that detects a biosignal according to movements of a joint connecting first and second body sites of a wearer, wherein in a state where the drive unit is located on a lateral side of the wearer's joint and the first and second frame units are fixed and retained corresponding to the wearer's first and second body sites, respectively, the control unit: estimates the wearer's task and phase on the basis of reference parameters stored in a data storage unit while performing drive control to cause the actuator to generate motive power in accordance with the wearer's intention on the basis of the biosignal detected by the biosignal detection unit, and adjusts the drive control to cause the actuator to generate motive power according to the phase; and compensates for mechanical impedance of a control object of an entire system composed of the entire device and the wearer on the basis of the physical quantity detected by the physical quantity detector and in accordance with viscoelasticity of the wearer and gravity of the control object of the entire system.

As a result, with the wearable motion assistance device in the state where the drive unit is located on a lateral side of a joint of the wearer wearing clothes and the first and second frame units are fixed and retained respectively corresponding to the wearer's first and second body sites, a driving torque of the actuator according to motions of the wearer's joint can be transmitted as an assist force to the first and second body sites without giving any physical burdens or hindrances in daily life to the wearer.

Moreover, the present invention is designed so that the physical quantity detector detects an absolute angle, a rotation angle, an angular velocity, angular acceleration, and a driving torque between the first and second housings as the physical quantity regarding the rotary motion between the first and second housings.

Furthermore, the present invention is designed so that: the first and second coupling parts of the drive unit have rotary shafts along a direction vertical to an output axis of the speed reducer; and the frame unit and the communication unit are coupled to the drive unit so that they can freely rotate about the rotary shafts of the first and second coupling parts.

As a result, with the wearable motion assistance device, the drive unit, the frame unit, and the communication unit can be mounted on the wearer in accordance with the shapes of the first and second body sites around the wearer's joint.

Furthermore, the present invention is designed so that the drive unit has a flat-shaped actuator, an actuator driver which performs drive control of the actuator, a speed reducer which converts a rotational speed of a rotor for the actuator into a specified speed reduction ratio and outputs the converted rotational speed, and a flat-shaped operating unit including a touch sensor; and a main body of the speed reducer and the actuator driver are housed in either one of the first or second housing to be substantially flush with each other and the operating unit is fixed to the main body of the speed reducer so that the actuator is located between the main body and the operating unit; and an output axis of the speed reducer is fixed to the other one of the first or second housing.

Consequently, by making the drive unit for the wearable motion assistance device as small and thin as possible, it becomes possible to make the wearer wear the wearable motion assistance device without giving them any physical burdens even in the state where the wearer is wearing clothes.

Furthermore, the present invention is designed so that each of the first and second frame units and the power source unit is formed so that a thickness of its housing is thinner than a thickness of the first and second housings which constitute the drive unit and engage with each other.

Consequently, by thinning all the frame unit, the communication unit, and the power source unit for the wearable motion assistance device with reference to the thick ness of the drive unit, it becomes possible to make the wearer wear the wearable motion assistance device without giving them any physical burdens even in the state where the wearer is wearing clothes.

Furthermore, the present invention is designed so that either one or both of the first and second frame units can be adjusted in a freely expandable and contractible manner in a direction of coupling to the coupling part. As a result, by adjusting the length of the wearable motion assistance device in accordance with the wearer's body site, it is possible to make the wearable motion assistance device perform motions by positioning the device at a desired joint site in the wearer's body.

Furthermore, the present invention is designed so that a wearable motion assistance device includes: a drive unit having first and second housings in which a stator side and a rotor side of an actuator are respectively housed and which engage with each other so that the first and second housings rotate separately according to driving of the actuator, wherein first and second coupling parts are formed to protrude from the first and second housings respectively in mutually opposite directions; a frame unit that is coupled to the first coupling part of the drive unit in a separable manner; a power source unit that is coupled to the second frame unit of the drive unit and is equipped with a battery for supplying electric power to the actuator; a control unit provided in the drive unit and designed to perform drive control of the actuator; a physical quantity detector that detects a physical quantity regarding a rotary motion between the first and second housings from a driving current supplied to the actuator; a biosignal detection unit that detects a biosignal according to movements of a joint connecting first and second body sites of a wearer; and a data storage unit that stores a reference parameter of each phase which is a sequence of minimum motion units that constitute a motion pattern of the wearer classified as a task, wherein in a state where the drive unit is located on a lateral side of the wearer's joint and the communication unit and the frame unit are fixed and retained corresponding to the wearer's first and second body sites, respectively, the control unit adjusts drive control of the adjustor to compensate for mechanical impedance of a control object of an entire system composed of the entire device and the wearer on the basis of the physical quantity detected by the physical quantity detector and in accordance with viscoelasticity of the wearer, while performing drive control to cause the actuator to generate motive power in accordance with the wearer's intention on the basis of the biosignal detected by the biosignal detection unit.

As a result, with the wearable motion assistance device in the state where the drive unit is located on a lateral side of a joint of the wearer wearing clothes and the communication unit and the frame unit are fixed and retained respectively corresponding to the wearer's first and second body sites, a driving torque of the actuator according to motions of the wearer's joint can be transmitted as an assist force to the first and second body sites without giving any physical burdens or hindrances in daily life to the wearer.

Advantageous Effects of the Invention

According to the present invention as described above, it is possible to realize the wearable motion assistance device which can reduce physical loads on the wearer, who is wearing clothes, as much as possible and can be made to perform motions by positioning the device at a desired joint site(s) in the wear's body.

DESCRIPTION OF EMBODIMENTS

An embodiment of the present invention will be described below in detail with reference to the drawings.

Figure 1:
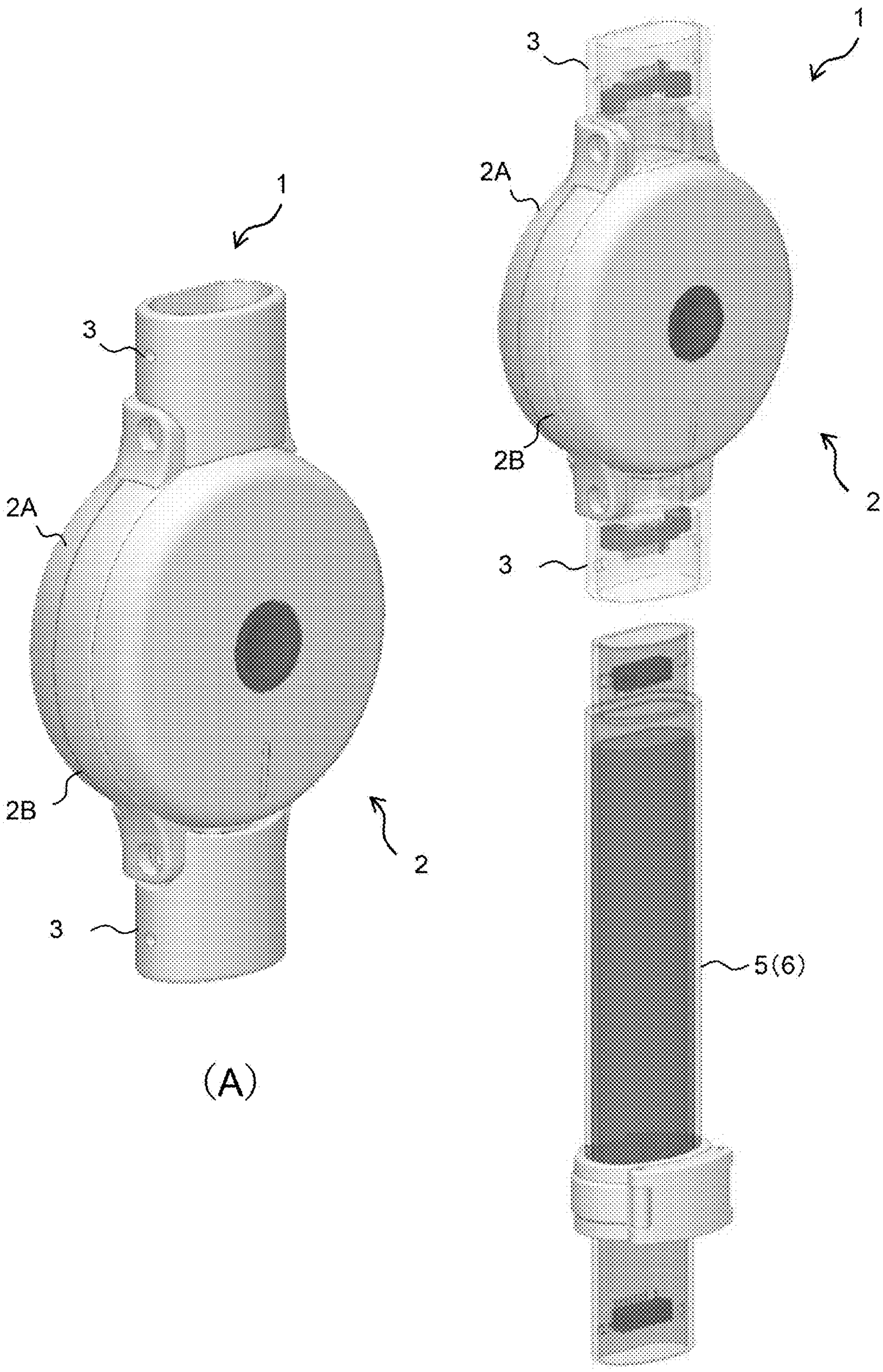
FIG. 1 is an external configuration diagram of a wearable motion assistance device according to a first embodiment.

(1) Configuration of Wearable Motion Assistance Device According to First Embodiment FIG. 1(A) and FIG. 1(B) illustrate a wearable motion assistance device 1 according to a first embodiment. With the wearable motion assistance device 1, a drive unit 2 has first and second housings 2A, 2B in which a stator side and a rotor side of an actuator 10 (FIG. 3) are respectively housed and which engage with each other so that they rotate separately according to driving of the actuator 10; and coupling parts of the same structure are formed to protrude from the first and second housings 2A, 2B respectively in mutually opposite directions.

Figure 2:
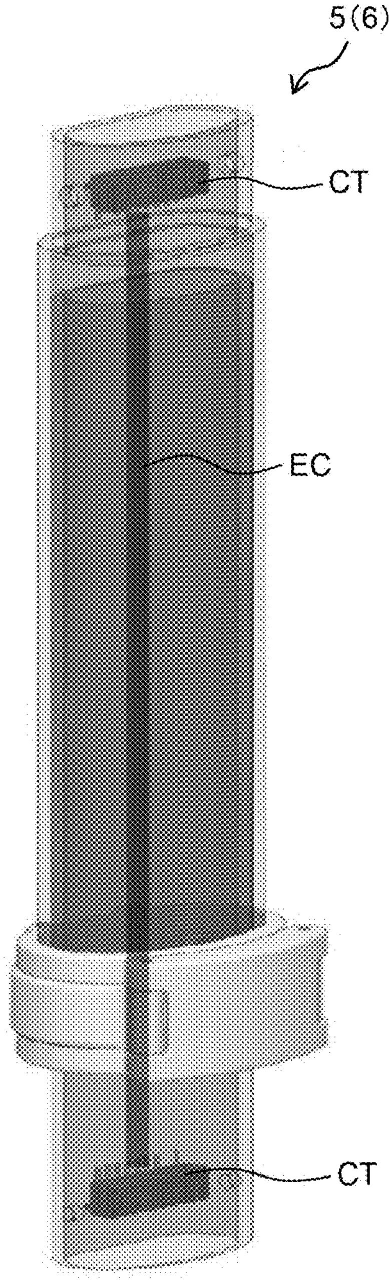
FIG. 2 is an external configuration diagram illustrating first and second frame units shown in FIG. 1.
Figure 2:
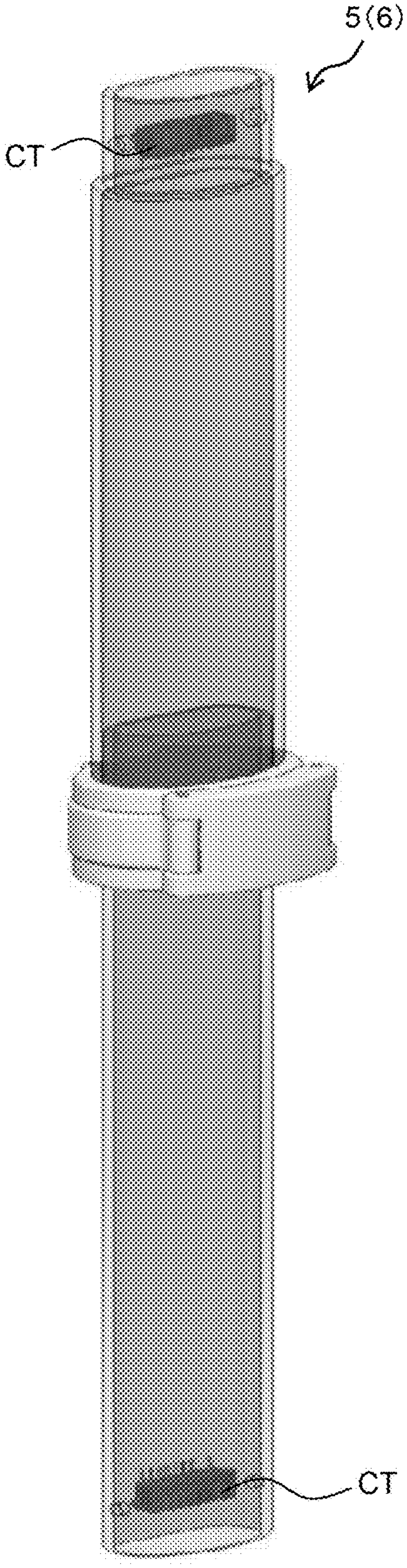

First and second frame units 5, 6 are coupled in a separable manner to the respective coupling parts 3 of this drive unit 2 (FIG. 2(B)). These first and second frame units 5, 6 can be adjusted in a manner freely expandable and contractible in a direction coupling to their corresponding coupling parts 3 as illustrated in FIG. 2(A) and FIG. 2(B). As a result, the wearable motion assistance device 1 can be made to perform motions by positioning the device at a desired joint site in a wearer's body by adjusting the length to the wearer's body site.

Furthermore, one end and the other end of each of the first and second frame units 5, 6 is provided with a connector CT of a specified structure and such connectors CT are electrically connected to each other by a freely-flexible extender cable EC through the inside of the frame.

Figure 3:
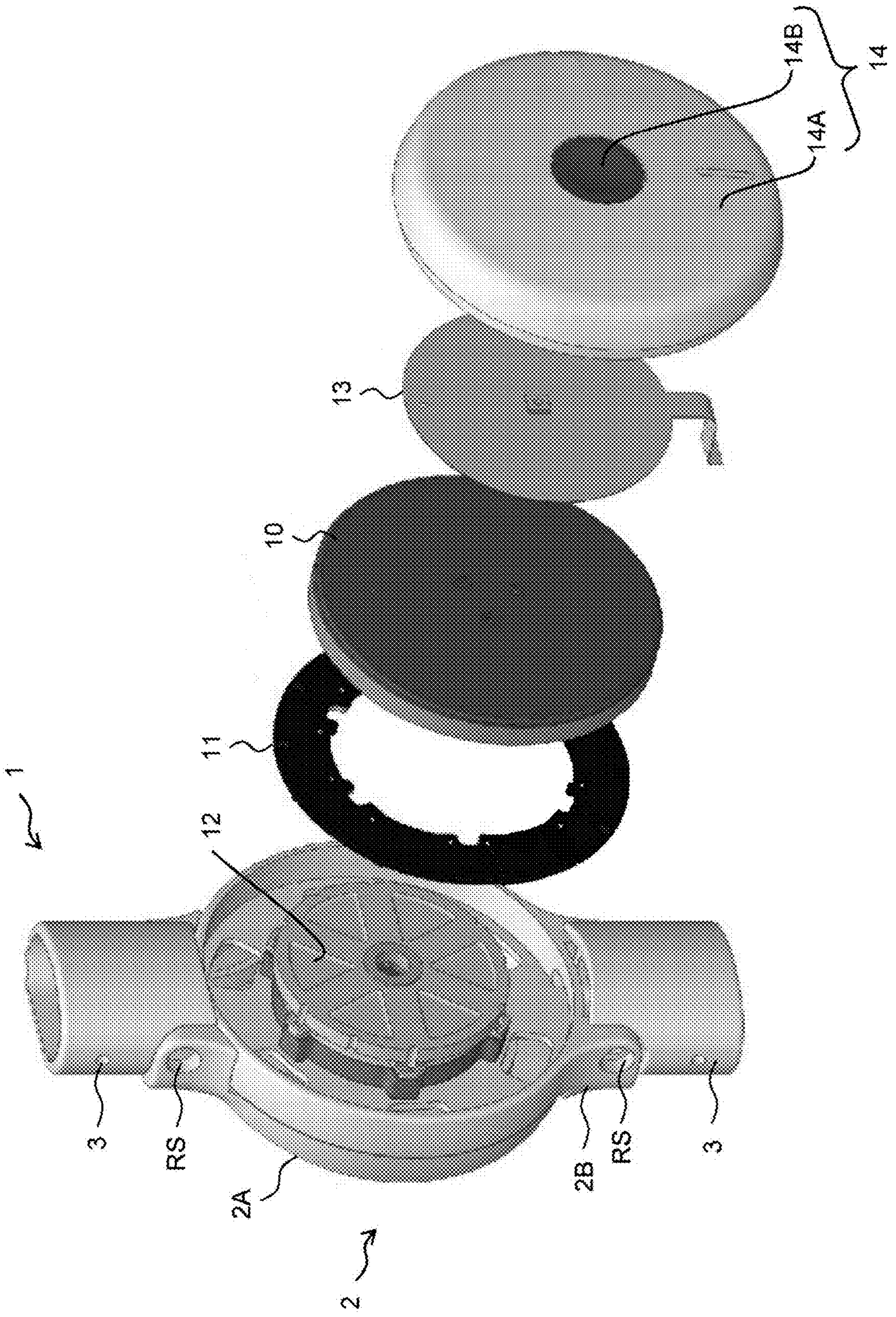
FIG. 3 is an exploded view illustrating the configuration of a drive unit for the wearable motion assistance device shown in FIG. 1.

The drive unit 2 includes, as illustrated in FIG. 3, a flat-shaped actuator 10 which is composed of, for example, a brushless DC motor, an actuator control unit 11 which performs drive control of the actuator 10, a speed reducer 12 which converts a rotational speed of a rotor for the actuator 10 into a specified speed reduction ratio and outputs it, and a flat-shaped operating unit 14 including a touch sensor 13.

An MCM (Multi-Chip Module) which is equipped with a CPU (Central Processing Unit), a memory, and so on is built in the actuator control unit 11.

The operating unit 14 is composed of a touch panel 14A which configures a housing surface, and a power source button 14B at the center of the housing; and the content of operations on the touch panel 14A through a finger touch by the wearer is reflected, as a detection result of the touch sensor 13, in the actuator control unit 11 and the power is turned on or off as the power source button 14B is pressed.

In the drive unit 2, a main body of the speed reducer 12 and the actuator control unit 11 are housed in either one of the first or second housing 2A, 2B to be substantially flush with each other; the operating unit 14 is fixed to the main body of the speed reducer 12 so that the actuator 10 is placed between them; and an output axis of the speed reducer 12 is fixed to the other one of the first or second housing 2A, 2B.

By making the drive unit 2 as small and thin as possible as described above, it becomes possible to make the wearer wear the device without giving them any physical burdens even in a state where the wearer is wearing clothes.

Each coupling part 3 of the drive unit 2 has a rotary shaft RS in a direction vertical to the output axis of the speed reducer 12 and each of the first and second frame units 5, 6 is coupled in a freely rotatable manner about the rotary shaft RS of its corresponding coupling part 3.

Moreover, a connector having a specified structure (not shown in the drawing) is built in each coupling part 3 of the drive unit 2 and such corresponding connectors CT are made to engage with each other and be electrically connected when the first and second frame units 5, 6 are coupled to the drive unit 2.

Consequently, the wearable motion assistance device 1 makes it possible to mount the drive unit 2 and the first and second frame units 5, 6 in accordance with the shapes of the first and second body sites around the wearer's joint.

Figure 4:
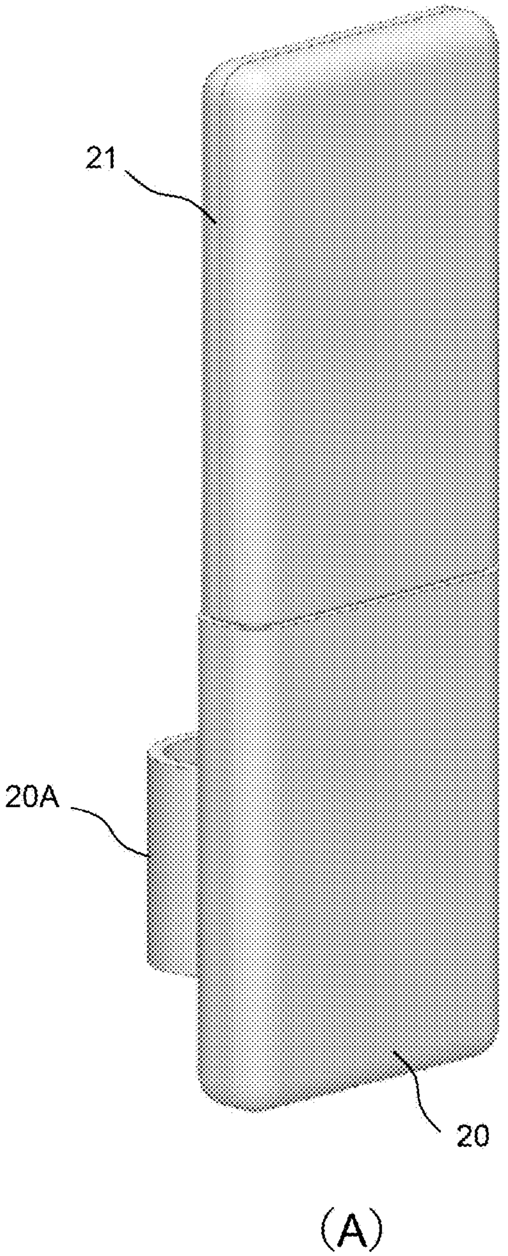
FIG. 4 is an external configuration diagram illustrating a communication unit and a power source unit which are integrated together.
Figure 4:
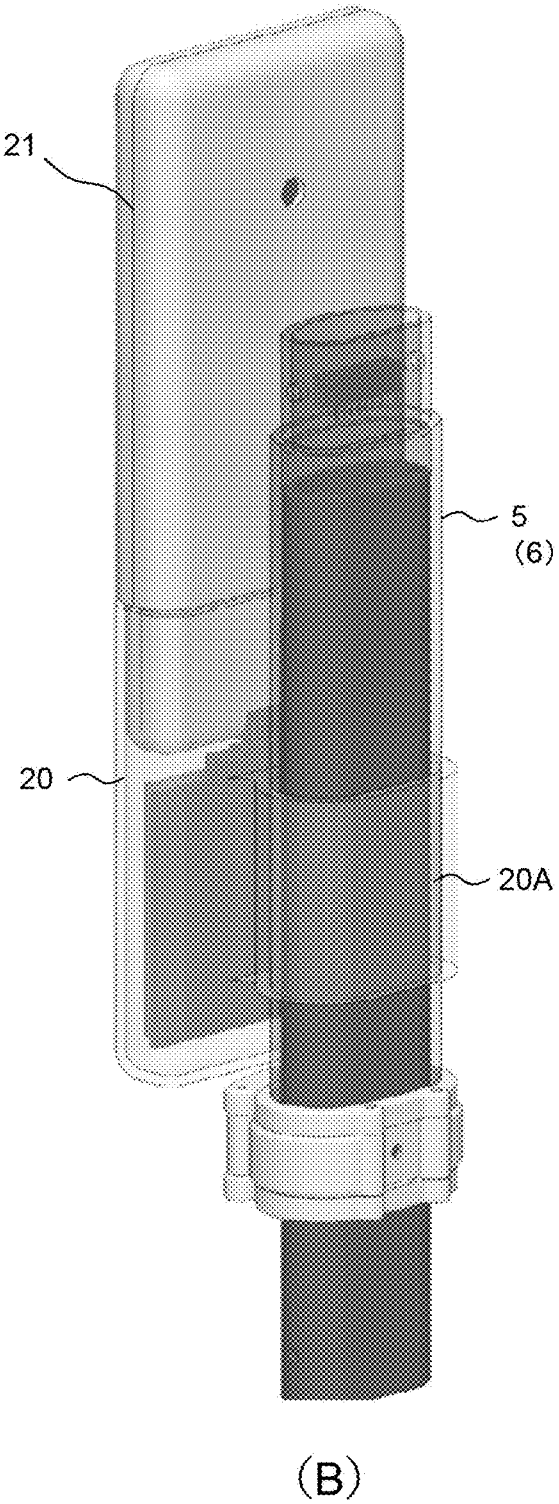

The wearable motion assistance device 1 is designed as illustrated in FIG. 4(A) and FIG. 4(B) so that a communication unit 20 and a power source unit 21 can be integrated together and engage with the first and second frame units 5, 6 in a freely attachable/detachable manner.

Figure 5:
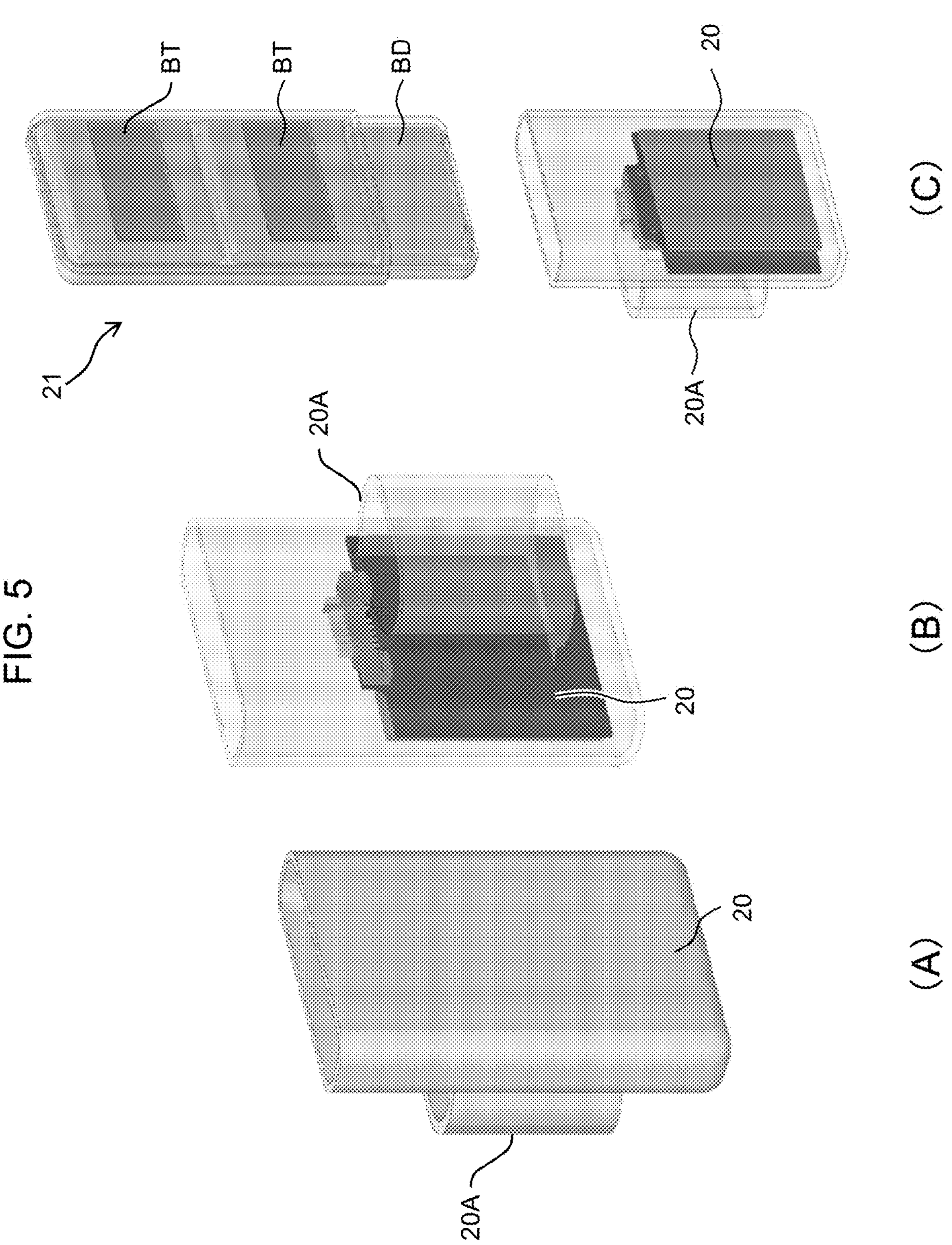
FIG. 5 is a transparent diagram illustrating an internal configuration of the communication unit and the power source unit which are shown in FIG. 4.

Specifically, as illustrated in FIG. 5(A) to FIG. 5(C), the communication unit 20 has a housing in a predetermined shape and is equipped with a communication function for transmitting and receiving data through connections via a near field communication method such as Bluetooth (registered trademark) or RF-ID. A fixed holder 20A for securing and retaining the first or second frame unit 5, 6 is formed to protrude from a lateral side of this housing and an engagement hole is formed at an upper end of the housing so that it can be freely attached to, or detached from and be integrated with the power source unit 21.

The communication unit 20 which is integrated with the power source unit 21 is wired-connected with the drive unit 2 in its vicinity to enable supply of electric power to the drive unit 2 when engaging with the first or second frame unit 5, 6. Incidentally, a battery BT, which is composed of a lithium ion secondary battery, and a battery driver BD are built in the power source unit 21, so that the power source unit 21 has a connector structure to enable an electric connection when engaging with the communication unit 20.

Furthermore, the wearable motion assistance device 1 has a biosignal detection sensor 41 (FIG. 6), which is composed of a contactless BES sensor for detecting a biosignal according to movements of a joint(s) which couple the wearer's first and second body sites together.

With the wearable motion assistance device 1 described above, in a state where the drive unit 2 is located on a lateral side of a joint of the wearer wearing clothes and the first and second frame units 5, 6 are fixed and retained respectively corresponding to the wearer's first and second body sites, the actuator control unit 11 can transmit a driving torque of the actuator 10 according to the movements of the wearer's joint as an assist force to the first and second body sites without giving any physical burdens or hindrances in daily life to the wearer by performing drive control of the actuator 10 for the drive unit 2 on the basis of a detection signal detected by the biosignal detection sensor 41.

Figure 6:
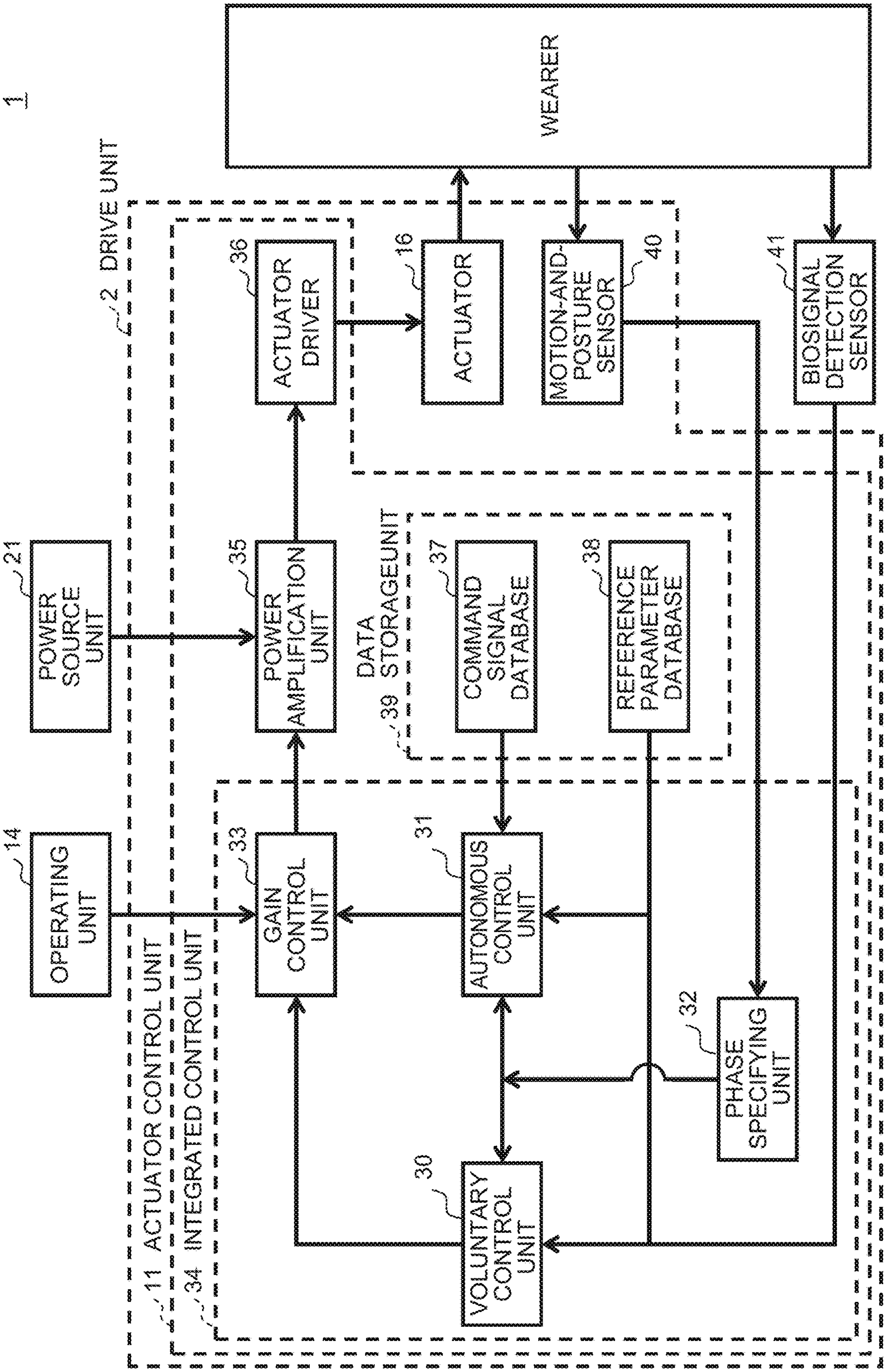
FIG. 6 is a block diagram illustrating an internal system configuration of the wearable motion assistance device.

(2) Control System Configuration of Wearable Motion Assistance Device According to First Embodiment FIG. 6 is a block diagram illustrating an internal system configuration of the wearable motion assistance device 1. The actuator control unit 11 for the drive unit 2, as illustrated in FIG. 6, includes: an integrated control unit 34 configured from a voluntary control unit 30, an autonomous control unit 31, a phase specifying unit 32, and a gain control unit 33; an electric power amplification unit 35 for electric power control of the power source unit 21; an actuator driver 36 for drive control of the actuator 10; and a data storage unit 39 configured from a command signal database 37 and a reference parameter database 38.

With this wearable motion assistance device 1, the actuator driver 36 in the drive unit 2 for imparting the assist force to the wearer is provided with a motion-and-posture sensor 40 which is composed of an angle sensor for detecting rotation angles of the first and second housings 10A, 10B as the wearer's joint rotate. Also, the wearable motion assistance device 1 is also provided with a biosignal detection sensor 41 (which is not illustrated in FIG. 1) for detecting a signal (biosignal) including, for example, the wearer's bioelectric potential.

In the integrated control unit 34, the voluntary control unit 30 supplies, to the power amplification unit 29, a command signal (a control signal for voluntary control) according to the detection signal (biosignal) detected by the biosignal detection sensor 41. The voluntary control unit 30 generates a command signal by applying a specified command function f(t) or gain P to the biosignal detection sensor 41. This gain P may be a preset value or function and can be adjusted via the gain control unit 33 according to the content of operations of the operating unit 14.

Moreover, the drive unit 2 can select a method for controlling a driving torque (the size of the torque and a rotation angle) of the actuator 10 on the basis of angle data detected by the motion-and-posture sensor 40 provided in the actuator control unit 11.

The angle data detected by the joint angle (θ) detected by this motion-and-posture sensor 40 is input to the reference parameter database 38. The phase specifying unit 32 identifies a phase of the wearer's motion by comparing the rotation angle of the joint, which is detected by the motion-and-posture sensor 40, with the joint angle and load which are reference parameters stored in the reference parameter database 38.

Then, when control data of the phase identified by the phase specifying unit 32 is obtained, the autonomous control unit 31 generates a command signal (a control signal of autonomous control) according to the control data of this phase and supplies, to the power amplification unit 29, a command signal for causing the actuator 10 for the drive unit 2 to generate this motive power.

Furthermore, the gain adjusted by the aforementioned gain control unit 32 is input to the autonomous control unit 31 and the autonomous control unit 31 generates a command signal according to this gain and outputs the generated command signal to the electric power amplification unit 35. The electric power amplification unit 35 controls the size of the driving torque and the rotation angle by controlling an electric current for driving the actuator 10 for the drive unit 2 and imparts the driving power by the actuator 10 for the drive unit 2 to the joint which couples the wearer's first and second body sites together.

With the wearable motion assistance device 1 described above, the control signal for controlling the drive unit 2 is amplified by the electric power amplification unit 35 on the basis of the detection signal detected by the biosignal detection sensor 41, which is pasted with reference to the wearer's joint, and is then supplied to the actuator 10 and the driving power of the actuator 10 is transmitted as an assist force to the wearer's joint.

Furthermore, with the wearable motion assistance device 1, the actuator control unit 11 for the drive unit 2 may: estimate the wearer's task and phase on the basis of the reference parameters stored in the data storage unit 39 and adjust the drive control relative to the actuator 10 so as to generate the motive power according to that phase; and compensate for mechanical impedance (inertia, viscosity, and rigidity) of a control object of the entire system, which is composed of the entire device and the wearer, in accordance with viscoelasticity of the wearer and gravity of the control object of the entire system on the basis of the absolute angle, the rotation angle, the angular velocity, and the angular acceleration by the motion-and-posture sensor 40 and the driving torque obtained from the actuator driver 36.

Incidentally, a compensation method for the above-mentioned mechanical impedance of the control object of the entire system in accordance with the viscoelasticity of the wearer is described in detail in a Japanese Patent Laid-Open Publication by the inventor of the present application (Japanese Patent Republication No. 2018-92325) and a compensation method in accordance with the gravity of the control object of the entire system is described in detail in a Registered Patent by the inventor of the present application (U.S. Pat. No. 4,178,187).

(3) Configuration of Wearable Motion Assistance Device According to Second Embodiment FIG. 7(A) and FIG. 7(B) illustrate a wearable motion assistance device 50 according to a second embodiment and the wearable motion assistance device 50 has a drive unit 51 equipped with the actuator 10 (FIG. 2), a communication unit 52 which is coupled in a freely movable manner to the drive unit 51, and a power source unit 53 which is attached to, and integrated with, the communication unit 52 in a freely detachable manner and is equipped with a battery for supplying the electric power to the actuator 10.

This wearable motion assistance device 50 has substantially the same configuration as that of the aforementioned wearable motion assistance device 1 (FIG. 1) according to the first embodiment, except for the shapes and structures of first and second housings 51A, 51B, which constitute the drive unit 51, and coupling parts 54.

This drive unit 51 has: the first and second housings 51A, 51B in which the stator side and the rotor side of the actuator 10 are housed respectively and which engage with each other so that they rotate separately according to the driving of the actuator 10; and first and second coupling parts 54A, 54B which are formed to protrude respectively in opposite directions from the first and second housings 51A, 51B.

Figure 8:
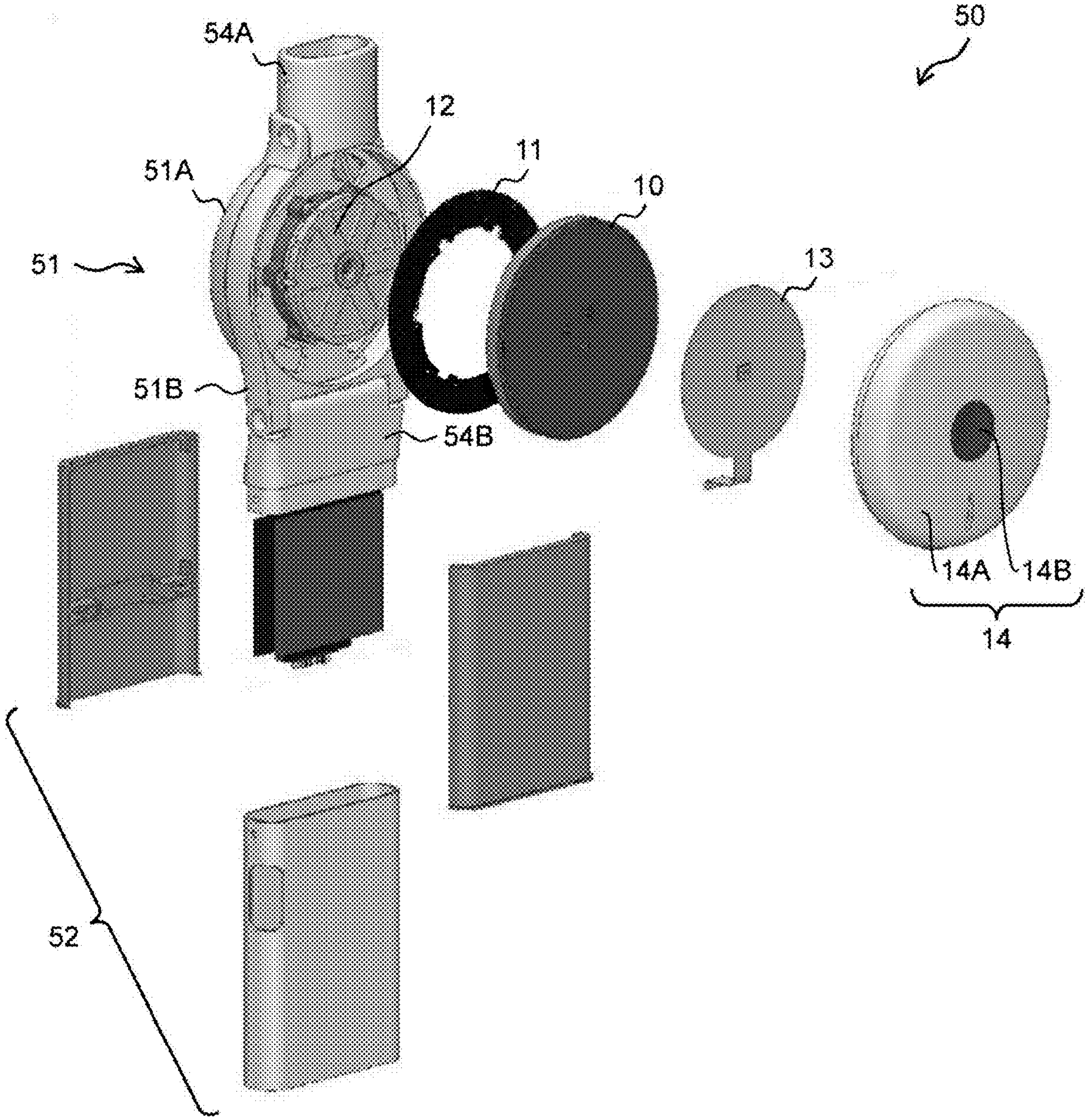
FIG. 8 is an exploded view illustrating the configuration of a drive unit for the wearable motion assistance device shown in FIG. 7.

Furthermore, specifically speaking, as illustrated in FIG. 8 in which the same reference numerals as those in FIG. 3 are assigned to parts corresponding to those in FIG. 3, the drive unit 51 has: the flat-shaped actuator 10 which is composed of, for example, a brushless DC motor; the actuator control unit 11 for performing drive control of the actuator 10; the speed reducer 12 which converts a rotational speed of a rotor for the actuator 10 into a specified speed reduction ratio and outputs it; and the flat-shaped operating unit 14 including the touch sensor 13.

In the drive unit 51, a main body of the speed reducer 12 and the actuator control unit 11 are housed in either one of the first or second housing 51A, 51B to be substantially flush with each other; the operating unit 14 is fixed to the main body of the speed reducer 12 so that the actuator 10 is placed between them; and an output axis of the speed reducer 12 is fixed to the other one of the first or second housing 51A, 51B.

With the wearable motion assistance device 50 as described above, by making the drive unit 51 as small and thin as possible as described above, it becomes possible to make the wearer wear the device without giving them any physical burdens even in a state where the wearer is wearing clothes.

Figure 9:
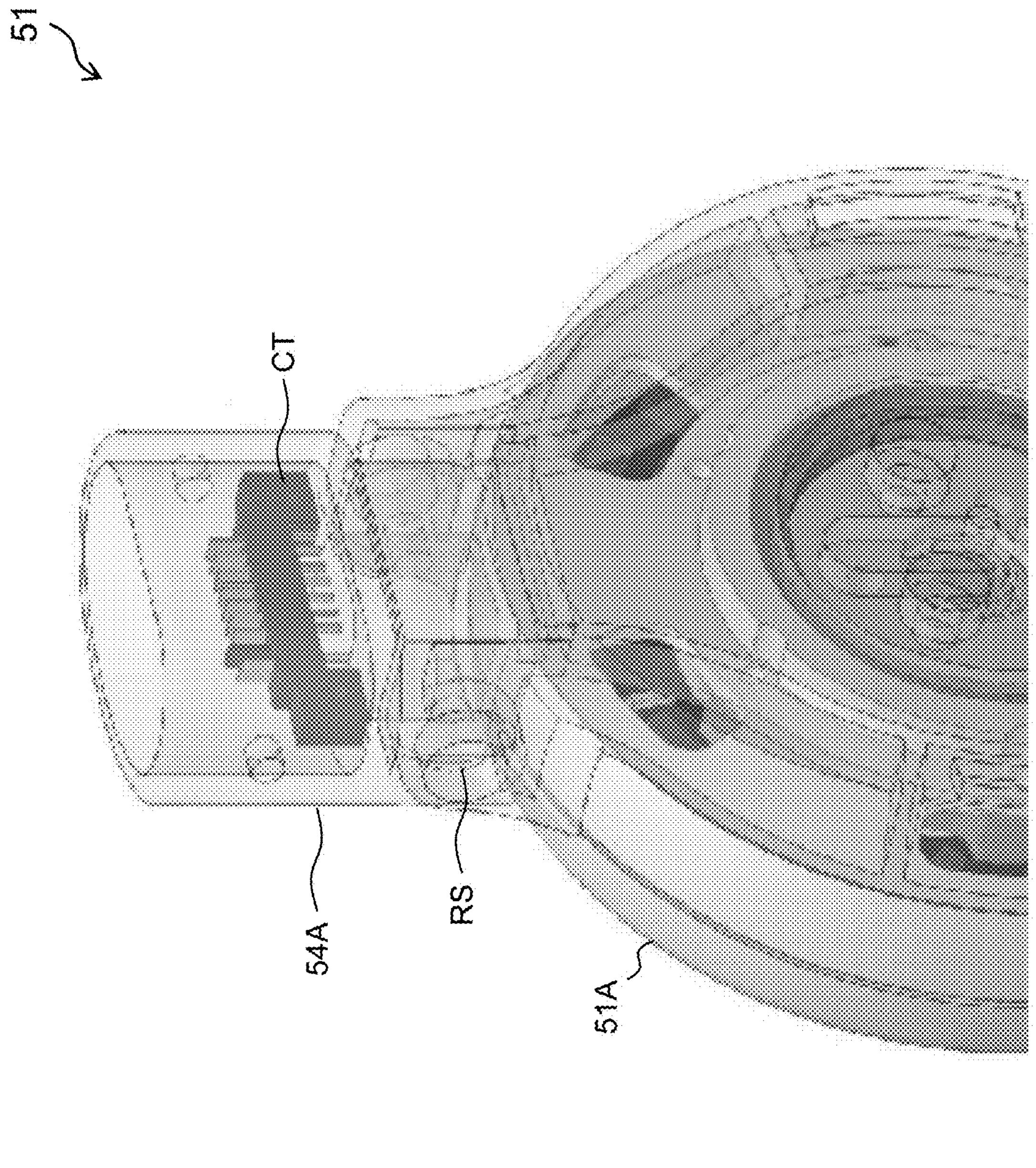
FIG. 9 is a transparent diagram illustrating an internal configuration of a coupling part of the drive unit shown in FIG. 8.

Referring to FIG. 9, each of the first and second coupling parts 54A, 54B for the drive unit 51 has a rotary shaft RS in a direction vertical to the output axis of the speed reducer 12 and the rotary shaft RS is coupled to the end of each first or second housing 51A, 51B in a freely rotatable manner.

Furthermore, a connector having a specified structure is built in each of the first and second coupling parts 54A, 54B for the drive unit 51 and such corresponding connectors CT are made to engage with each other and be electrically connected when a frame unit (which is not illustrated in the drawing) and the communication unit 51 are coupled to the coupling parts, respectively.

Consequently, the wearable motion assistance device 50 makes it possible to mount the drive unit 51, the frame unit (which is not shown in the drawing), and the communication unit 52 in accordance with the shapes of the first and second body sites around the wearer's joint.

Figure 7:
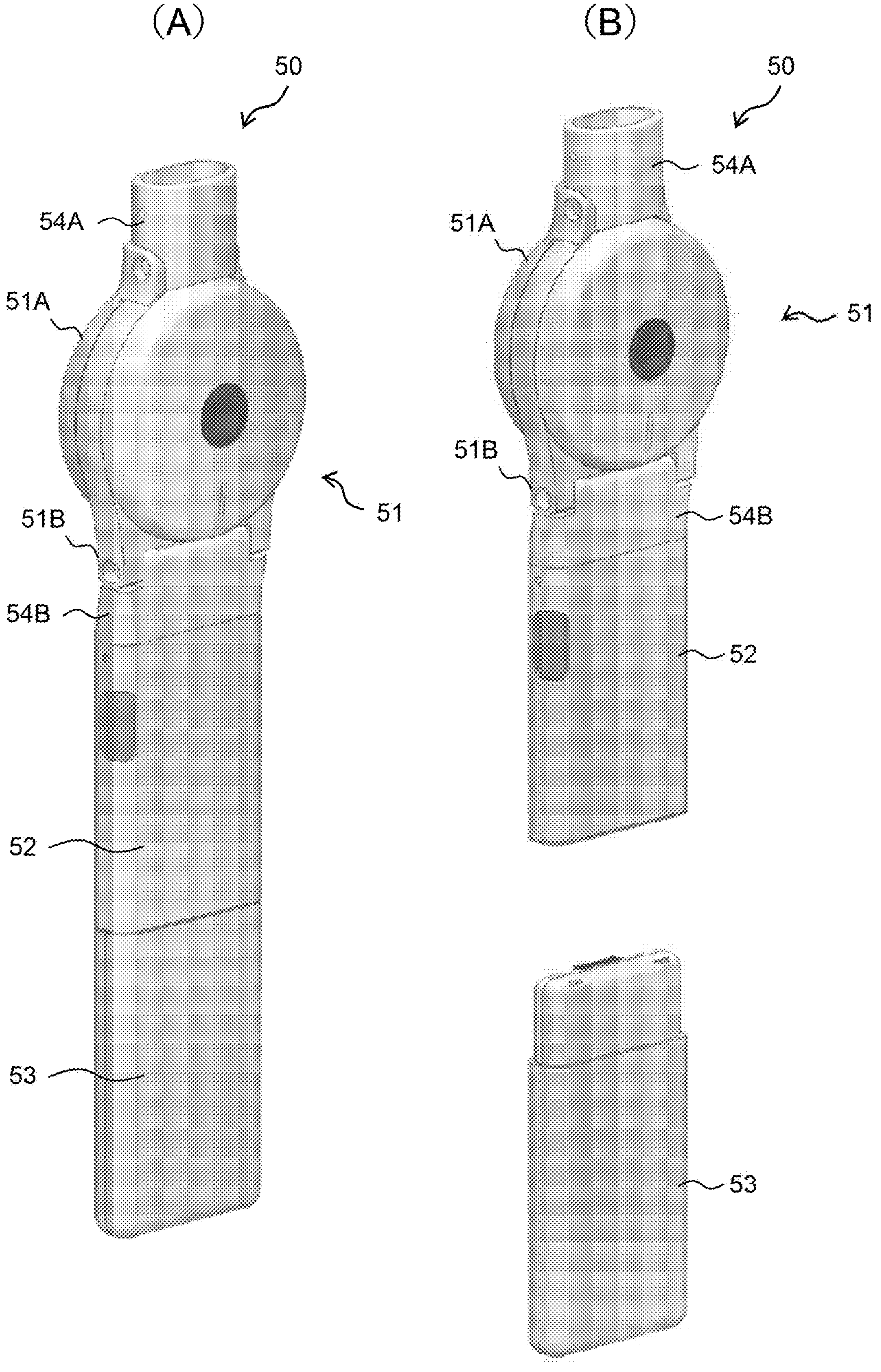
FIG. 7 is an external configuration diagram of a wearable motion assistance device according to a second embodiment.

Referring to FIG. 7, in the wearable motion assistance device 50, the frame unit (which is not illustrated in FIG. 7) is coupled to the first coupling part 54A for the drive unit 51 in a separable manner and the communication unit 52 (including the integrated power source unit 53 which is integrated therewith) is coupled to the second coupling part 54B for the drive unit 51.

Regarding each of the frame unit (which is not illustrated in the drawing), the communication unit 52, and the power source unit 53, the thickness of its housing is formed to be thinner than the thickness of the first and second housings 51A, 51B which configures the drive unit 51 and engage with each other. Consequently, with the wearable motion assistance device 50, by thinning all the frame unit (which is not illustrated in the drawing), the communication unit 52, and the power source unit 53 with reference to the thickness of the drive unit 51, it becomes possible to make the wearer to wear the device without giving them any physical burdens even in the state where the wearer is wearing clothes.

Furthermore, the wearable motion assistance device 50 has the biosignal detection sensor 41 (which is not illustrated in the drawing) for detecting a biosignal according to movements of a joint which couples the wearer's first and second body sites together in the same manner as in the aforementioned first embodiment.

With this wearable motion assistance device 50 in a state where the drive unit 51 is located on a lateral side of the wearer's joint and the communication unit 52 and the frame unit (which is not illustrated in the drawing) are fixed and retained respectively corresponding to the wearer's first and second body sites, the actuator control unit 11 perform drive control of the actuator 10 for the drive unit 51 on the basis of a detection signal detected by the biosignal detection sensor 41.

As a result, the wearable motion assistance device 50 can transmit the driving torque of the actuator 10 according to the movements of the wearer's joint as an assist force to the first and second body sites without giving any physical burdens or hindrances in daily life to the wearer wearing clothes.

Figure 10:
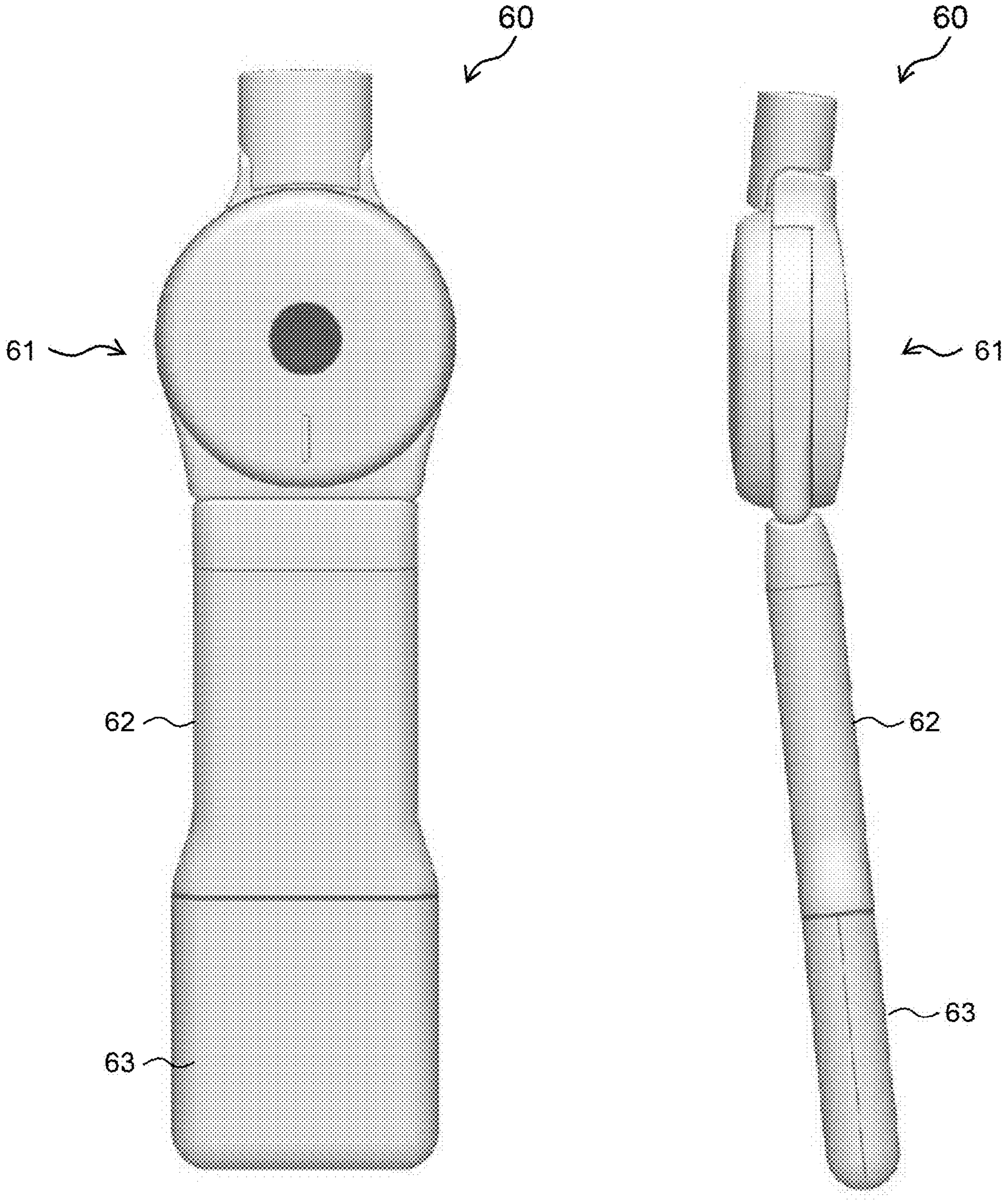
FIG. 10 is an external configuration diagram illustrating a variation of an appearance design of the wearable motion assistance device according to the second embodiment.
Figure 11:
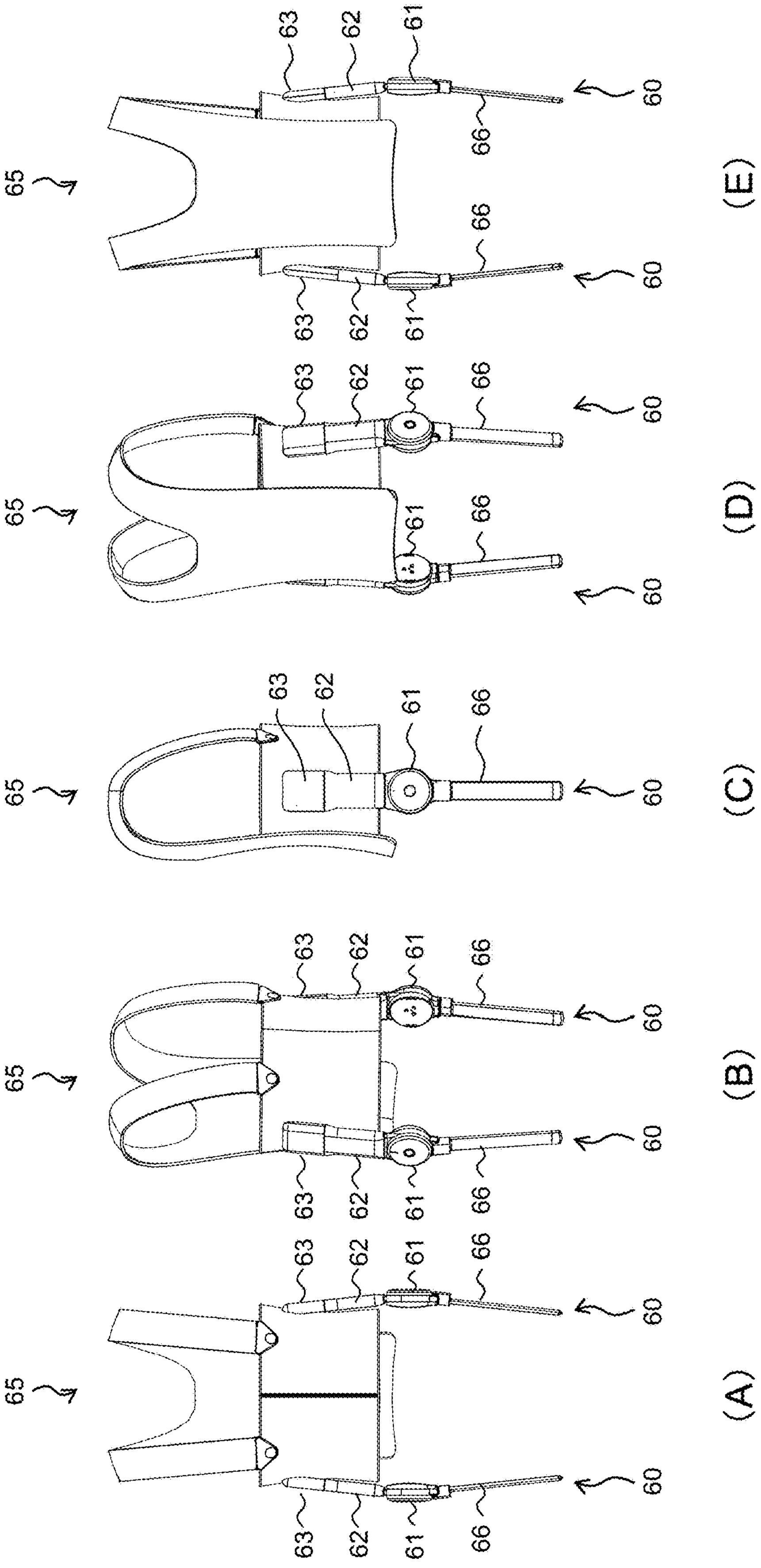
FIG. 11 is a schematic diagram illustrating a combination of the wearable motion assistance device shown in FIG. 7 and a suspension-belt-type corset.
Figure 12:
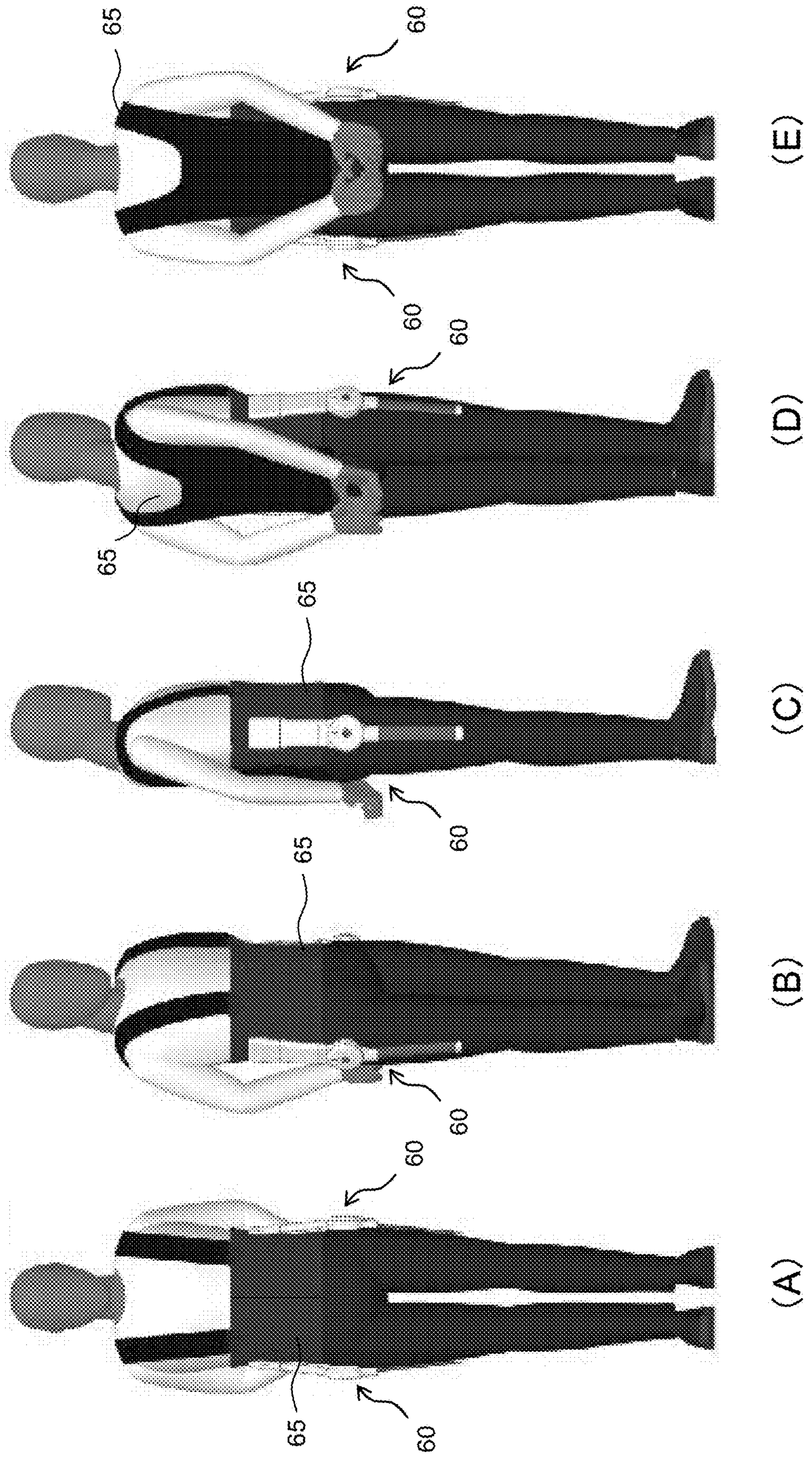
FIG. 12 is a schematic diagram illustrating a state of a wearer wearing a device composed of the combination in FIG. 7.

(4) Variations of Wearable Motion Assistance Device According to Second Embodiment FIG. 10(A) and FIG. 10(B) illustrate a wearable motion assistance device 60 showing a variation of an appearance design of the aforementioned wearable motion assistance device 50. It has the same internal configuration as that of the wearable motion assistance device 50 illustrated in FIG. 7(A) and FIG. 7(B), except that part of a housing configuration of a drive unit 61 and a housing configuration of a communication unit 62 and a power source unit 63 are different.

This wearable motion assistance device 60 is designed to be capable of supporting motions of both hip joints of the wearer by attaching a suspension-belt-type corset 65 in a freely attachable/detachable manner to support the wearer's lower back part as illustrated in FIG. 11(A) to FIG. 11(E).

Specifically speaking, as illustrated in FIG. 11(A) to FIG. 11(E) and FIG. 12(A) to FIG. 12(E), communication units 62 and power source units 63 in a pair of wearable motion assistance devices 60 are fixed and attached to both lower ends of the corset 65, respectively, and cuffs (which are not illustrated in the drawing) which are secured and fixed at the respective frame units 66 are made to enter contact with both thigh parts. The enter device is supported by a suspension belt in contact with both shoulders and a pair of drive units 61 are positioned on both sides of the hip joints, respectively.

Consequently, as the wearer wears the corset 65 into which the wearable motion assistance devices 60 are incorporated, it is possible to generate the assist force to assist movements of the thigh parts relative to the lower back part when the wearer stands up from their bent state (a semi-crouching posture). Furthermore, regarding the wearer's motions other than the motion to stand up from the semi-crouching posture, it is also possible to perform, for example, a motion to lift a heavy article from the semi-crouching posture and a motion to assist moving from one place to another.

Figure 13:
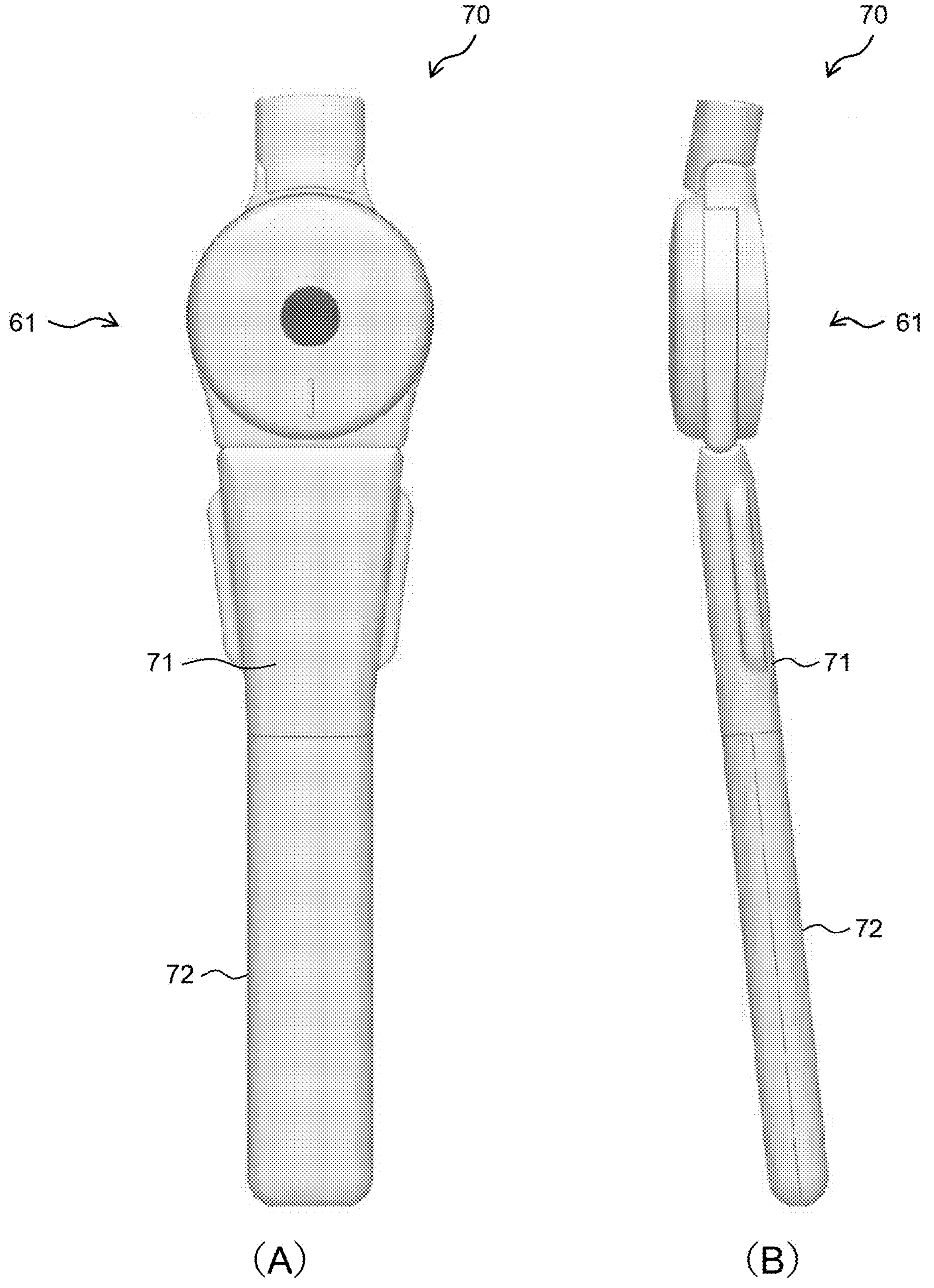
FIG. 13 is an external configuration diagram illustrating a variation of an appearance design of the wearable motion assistance device according to the second embodiment.
Figure 14:
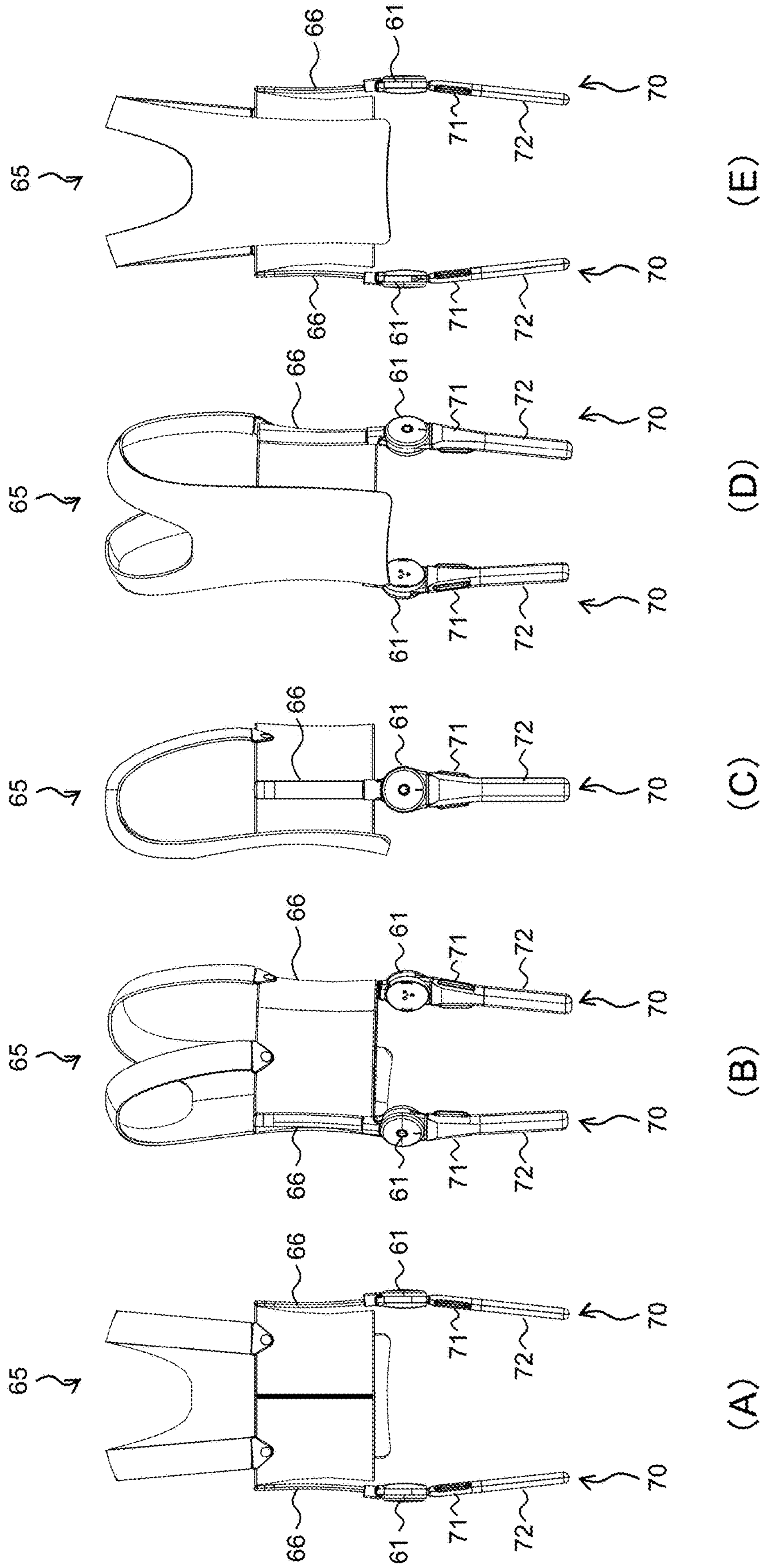
FIG. 14 is a schematic diagram illustrating a combination of the wearable motion assistance device shown in FIG. 13 and a suspension-belt-type corset.
Figure 15:
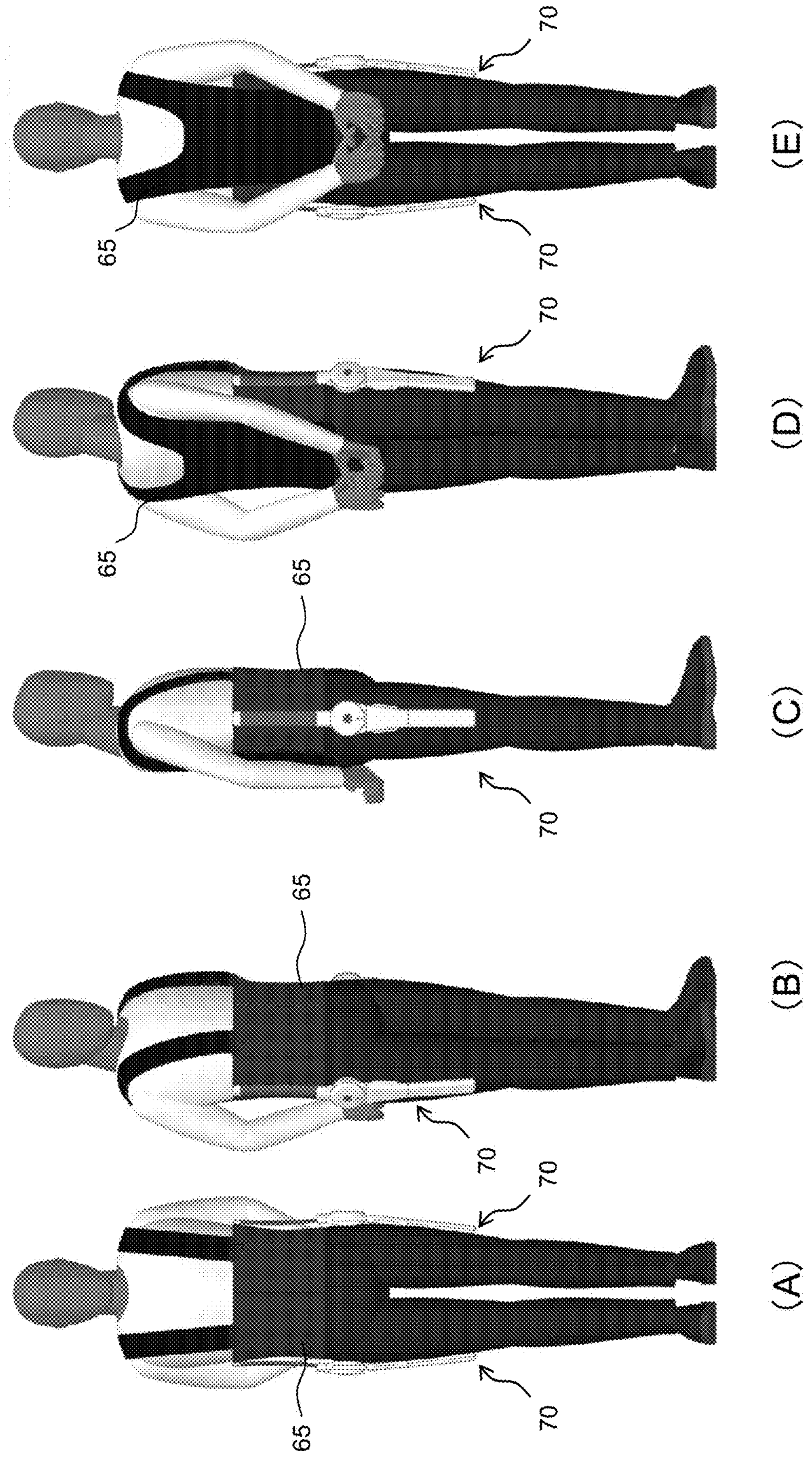
FIG. 15 is a schematic diagram illustrating a state of the wearer wearing a device composed of the combination in FIG. 13.

Furthermore, FIG. 13(A) and FIG. 13(B), in which the same reference numerals as those in FIG. 7(A) and FIG. 7(B) are assigned to parts corresponding to those in FIG. 7(A) and FIG. 7(B), illustrate a wearable motion assistance device 70 as another design. This wearable motion assistance device 70 has the same configuration as that of the aforementioned wearable motion assistance device 50, except that a communication unit 71 and a power source unit 72 have relatively slim housings. The state of wearing the corset 62 into which this wearable motion assistance device 70 is incorporated is illustrated in FIG. 14(A) to FIG. 14(E) and FIG. 15(A) to FIG. 15(E).

This wearable motion assistance device 70 is designed, unlike the aforementioned wearable motion assistance device 50, so that a frame unit 66 is fixed and mounted at each of both lower ends of the corset 65 and cuffs (which are not illustrated in the drawing) secured and fixed to the communication unit 71 and the power source unit 72 which are integrated together are made to enter into contact with both thigh parts.

Figure 16:
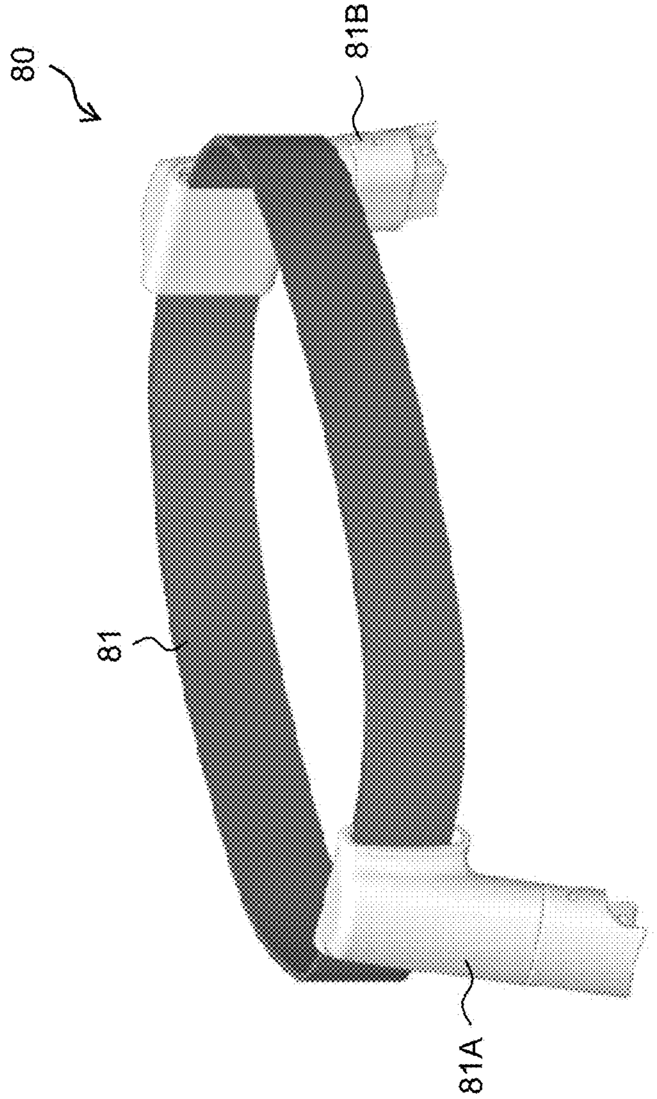
FIG. 16 is an external configuration diagram illustrating a variation of a frame unit (a lower back belt) for the wearable motion assistance device according to the second embodiment.
Figure 17:
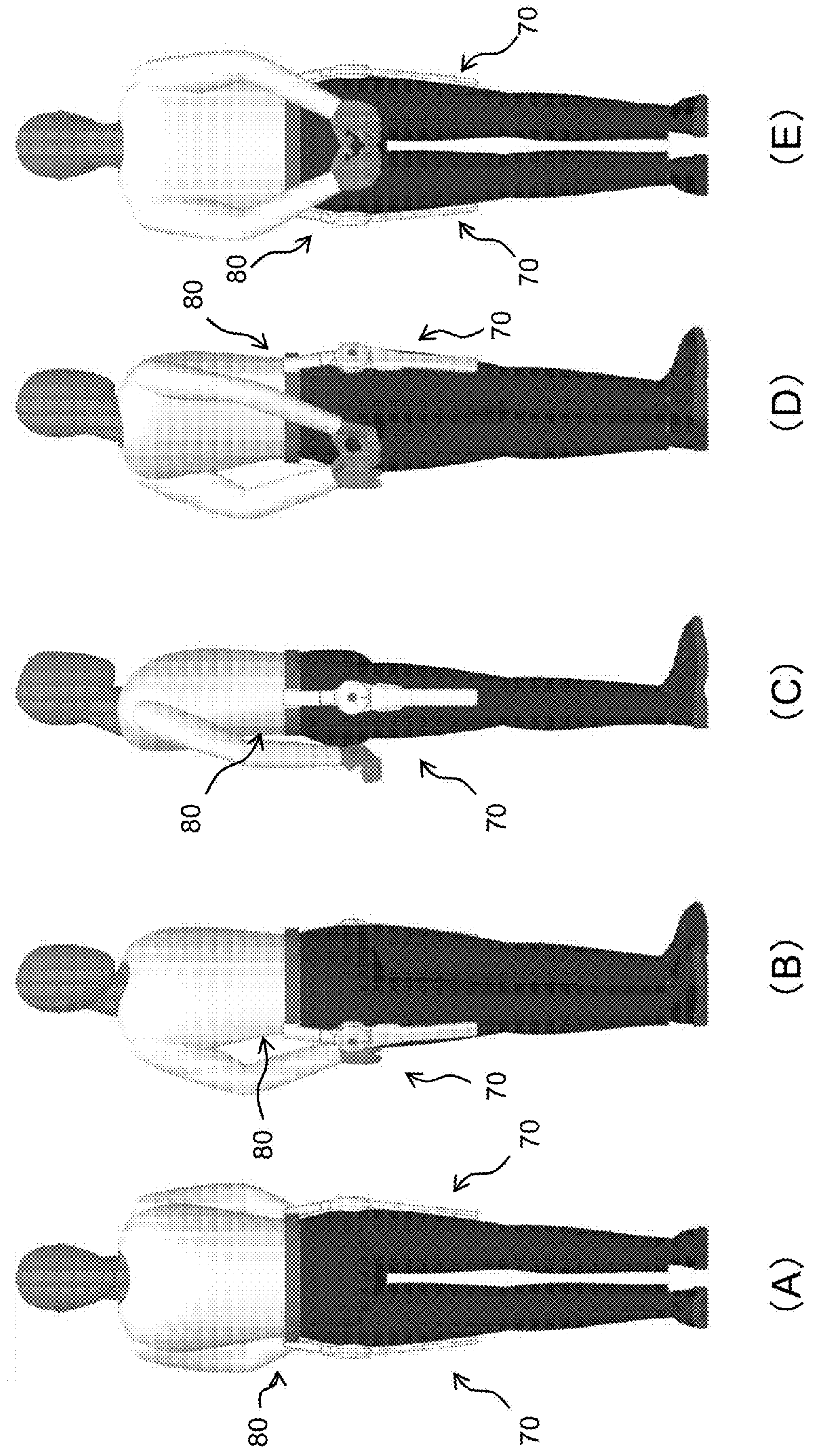
FIG. 17 is a schematic diagram illustrating a state of the wearer wearing a device including the frame unit in FIG. 16.
Figure 18:
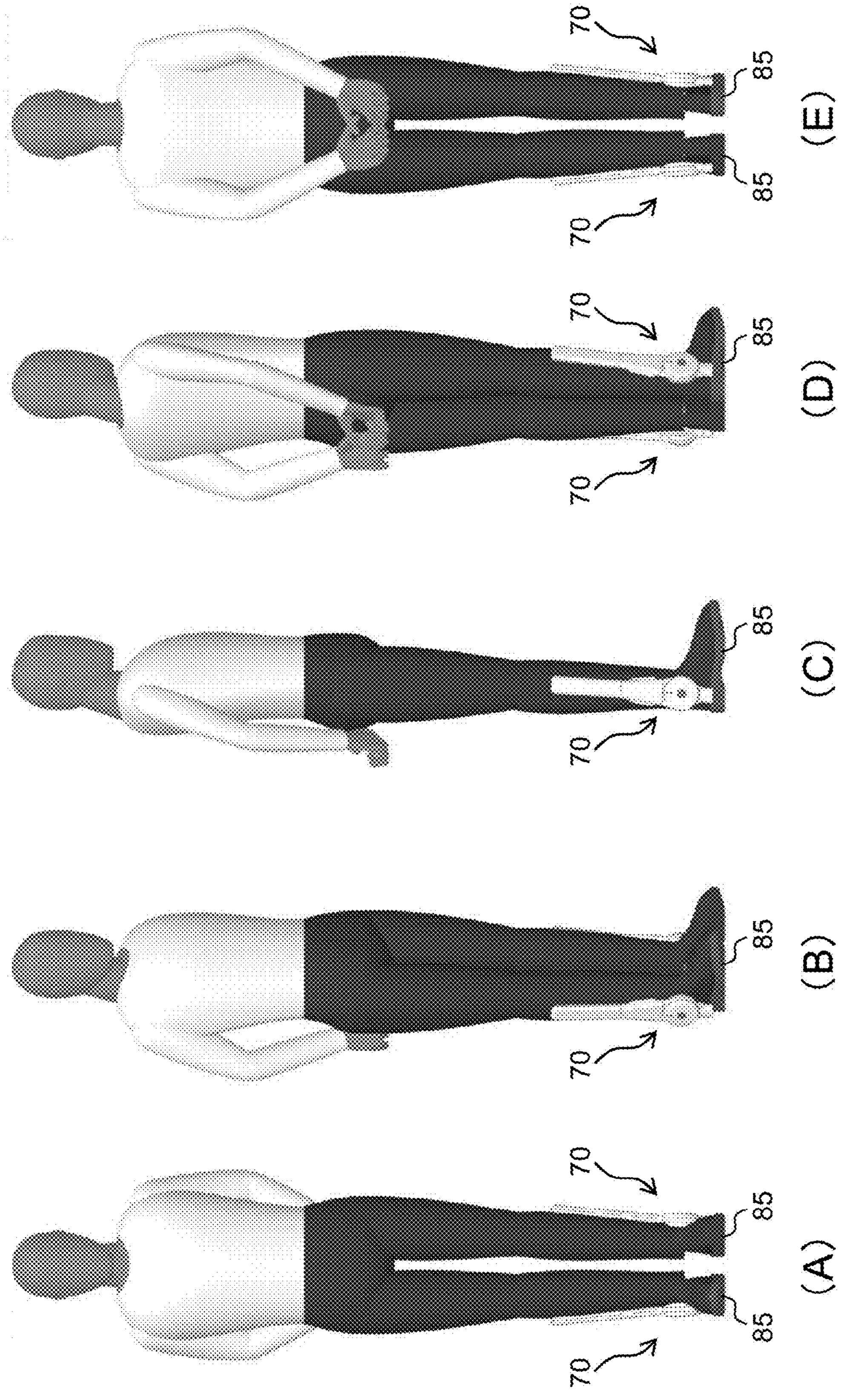
FIG. 18 is a schematic diagram illustrating a state of the wearer wearing the wearable motion assistance device shown in FIG. 13 at their ankles.
Figure 19:
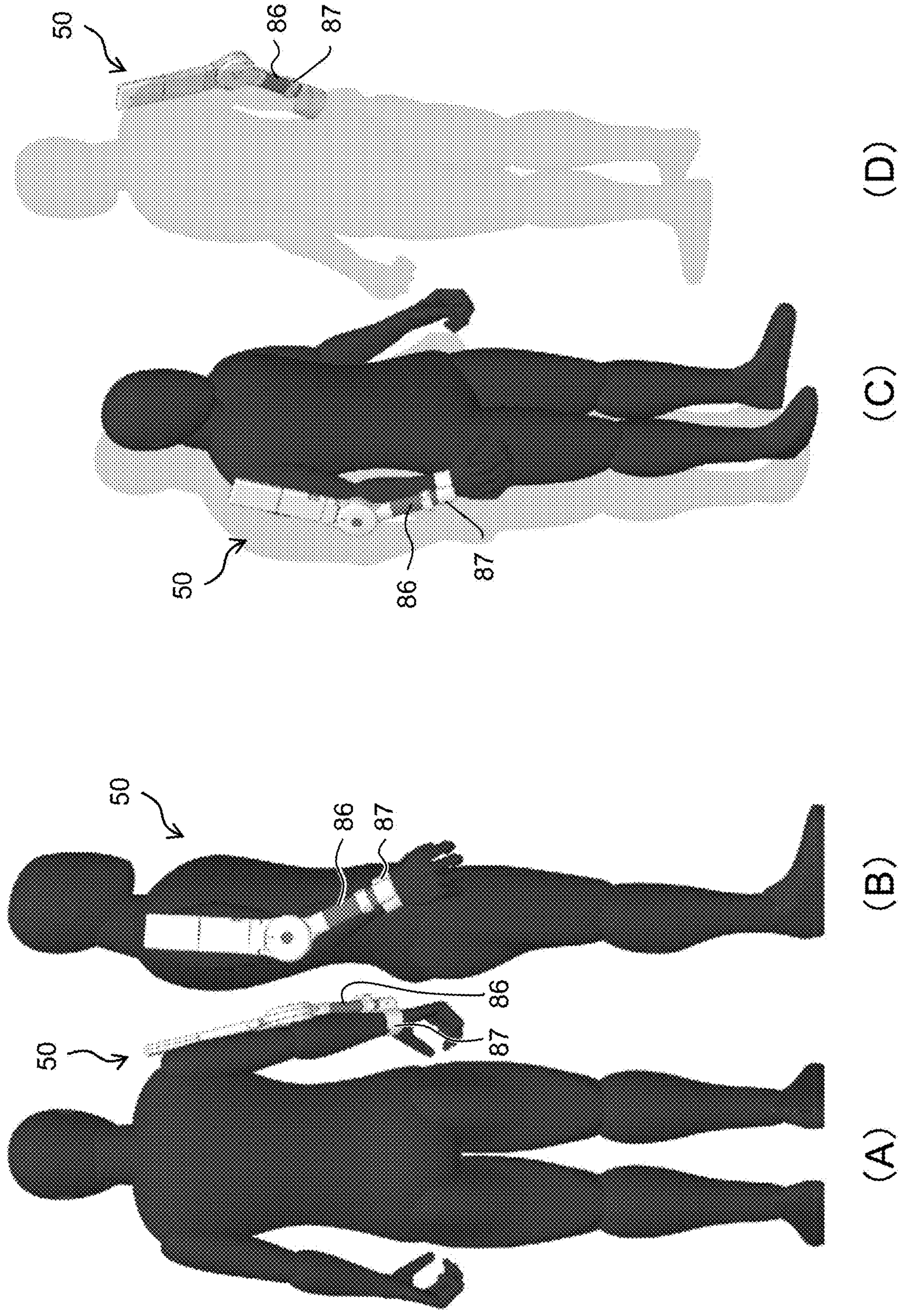
FIG. 19 is a schematic diagram illustrating a state of the wearer wearing the wearable motion assistance device shown in FIG. 7 on their upper arm.
Figure 20:
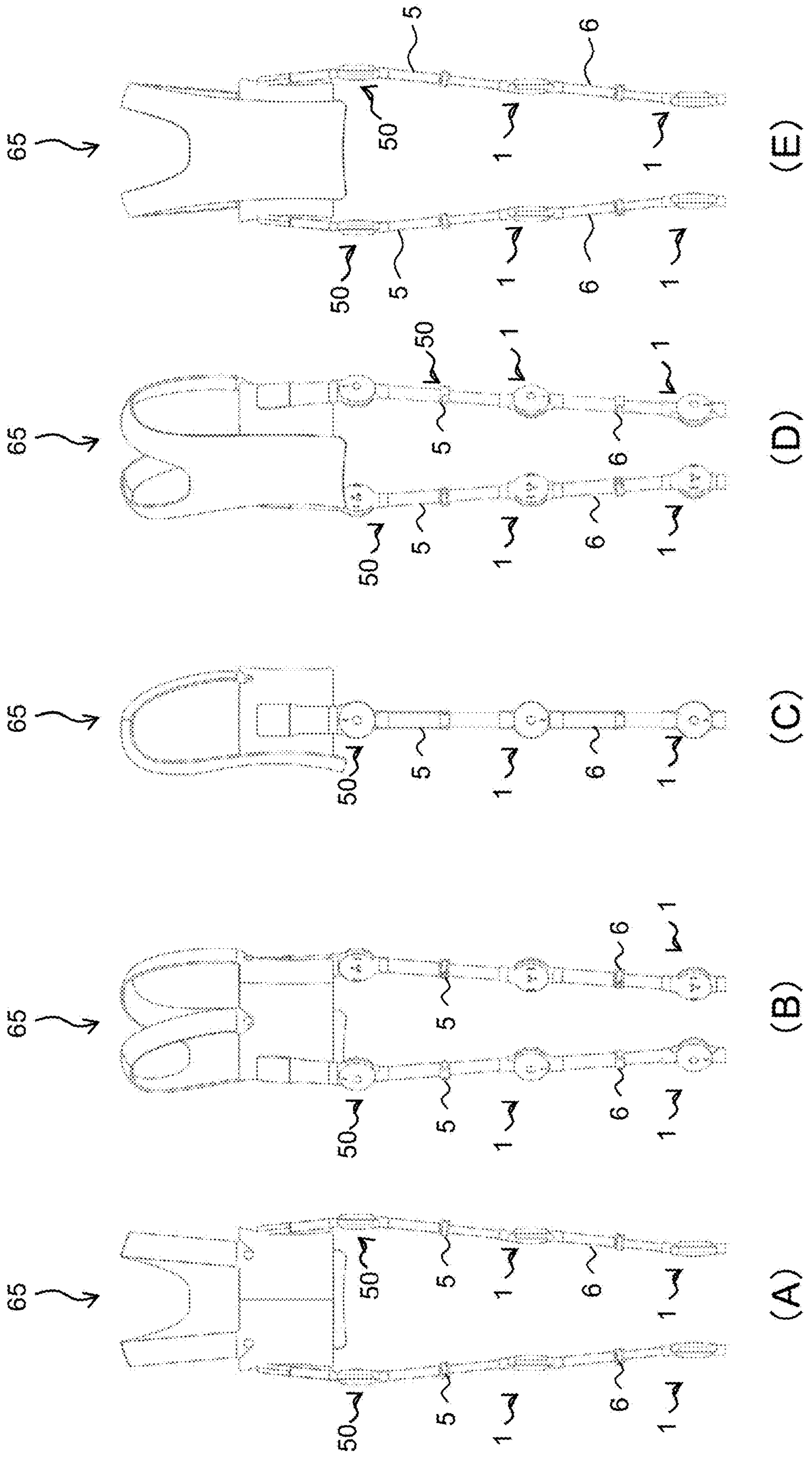
FIG. 20 is a schematic diagram illustrating a combination of the wearable motion assistance devices shown in FIG. 1 and FIG. 7 and a suspension-belt-type corset.
Figure 21:
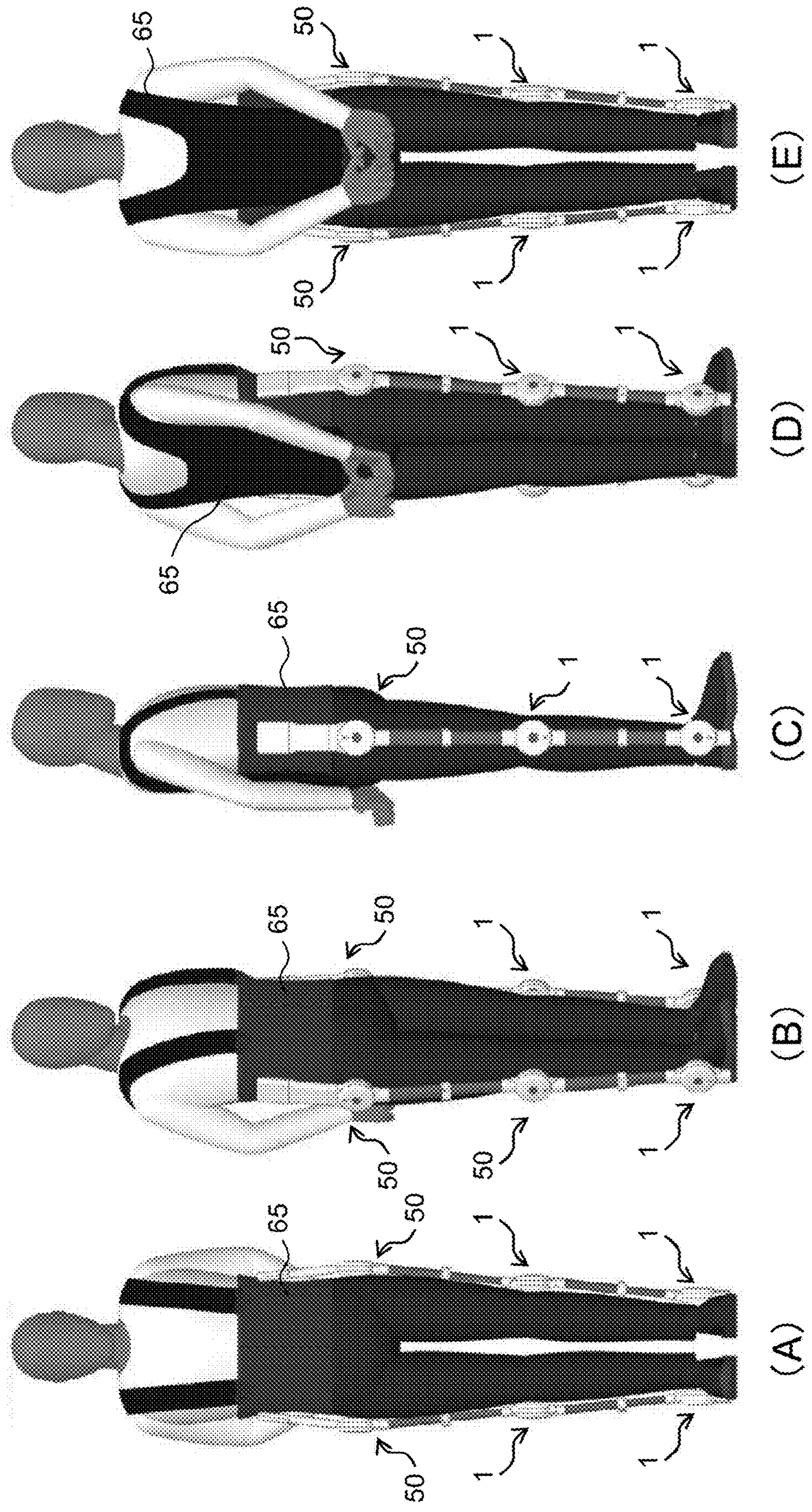
FIG. 21 is a schematic diagram illustrating a state of the wearer wearing a device composed of the combination in FIG. 20.

Furthermore, as another type of device wearing method, it is also possible to support motions of both the hip joints of the wearer by combining a pair of wearable motion assistance devices 70 (50, 60) by using a lower back belt 81, on which a pair of fixed holders 81A, 81B are formed on its both sides, as a frame unit 80 as illustrated in FIG. 16.

Specifically speaking, a coupling part of a drive unit 61 for the wearable motion assistance device 70 is coupled to each of the pair of fixed holders 81A, 81B formed on the lower back belt 81 in the frame unit 80 and the cuff (which is not illustrated in the drawing) to which the communication unit 71 and the power source unit 72 are fixed and secured are made to enter contact with both the thigh parts, thereby positioning the pair of drive units 71 respectively on both sides of the hip joints. This device-wearing state is illustrated in FIG. 17(A) to FIG. 17(E).

Furthermore, as another type of device wearing method, it is also possible to support motions of the wearer's ankle joint(s) by using a shoe(s) 85 on which a fixed holder (which is not illustrated in the drawing) is formed on the outside of a heel as illustrated in FIG. 18(A) to FIG. 18(E). Specifically speaking, a coupling part of the drive unit 71 for the wearable motion assistance device 70 is coupled to the fixed holder formed on each of the right and left shoes 85 and the cuff (which is not illustrated in the drawing) which is fixed and secured to the communication unit 71 and the power source unit 72 is made to enter into contact with an ankle part, thereby positioning the pair of drive units 71 to both sides of the ankles joints, respectively.

Furthermore, as another type of device wearing method, it is also possible to support motions of the wear's elbow joint, as illustrated in FIG. 19(A) to FIG. 19(D), by wrapping and retaining a cuff 87, which is fixed and secured to a frame unit 86, around a wrist in a state where the drive unit 51 for the wearable motion assistance device 50 illustrated in FIG. 7 is positioned on the outside of the elbow, and by wrapping and retaining a cuff (which is not illustrated in the drawing) secured and fixed to the communication unit 52 and the power source unit 53, which are integrated together, around the upper arm.

(5) Application Examples of Wearable Motion Assistance Devices According to First and Second Embodiments The wearable motion assistance devices 1, 50, 60, 70 according to the aforementioned first and second embodiments can be combined together and be made to perform motions by positioning the devices at a desired joint site(s) in the wearer's body.

For example, as illustrated in FIG. 20(A) to FIG. 20(E), in which the same reference numerals as those in FIG. 11(A) to FIG. 11(E) are assigned to parts corresponding to those in FIG. 11(A) to FIG. 11(E), a desired number of the wearable motion assistance devices 1 may be further combined with a pair of the wearable motion assistance devices 70 to which the aforementioned suspension-belt-type corset 65 is attached in a freely attachable/detachable manner.

FIG. 21(A) to FIG. 21(E) illustrate a state where practically the first and second wearable motion assistance devices 1, 50 (FIG. 1 and FIG. 7) are combined together and mounted on the wearer. Consequently, it becomes possible to support the wearer's motions of both their hip joints, both their knee joints, and both their ankle joints.

Figure 22:
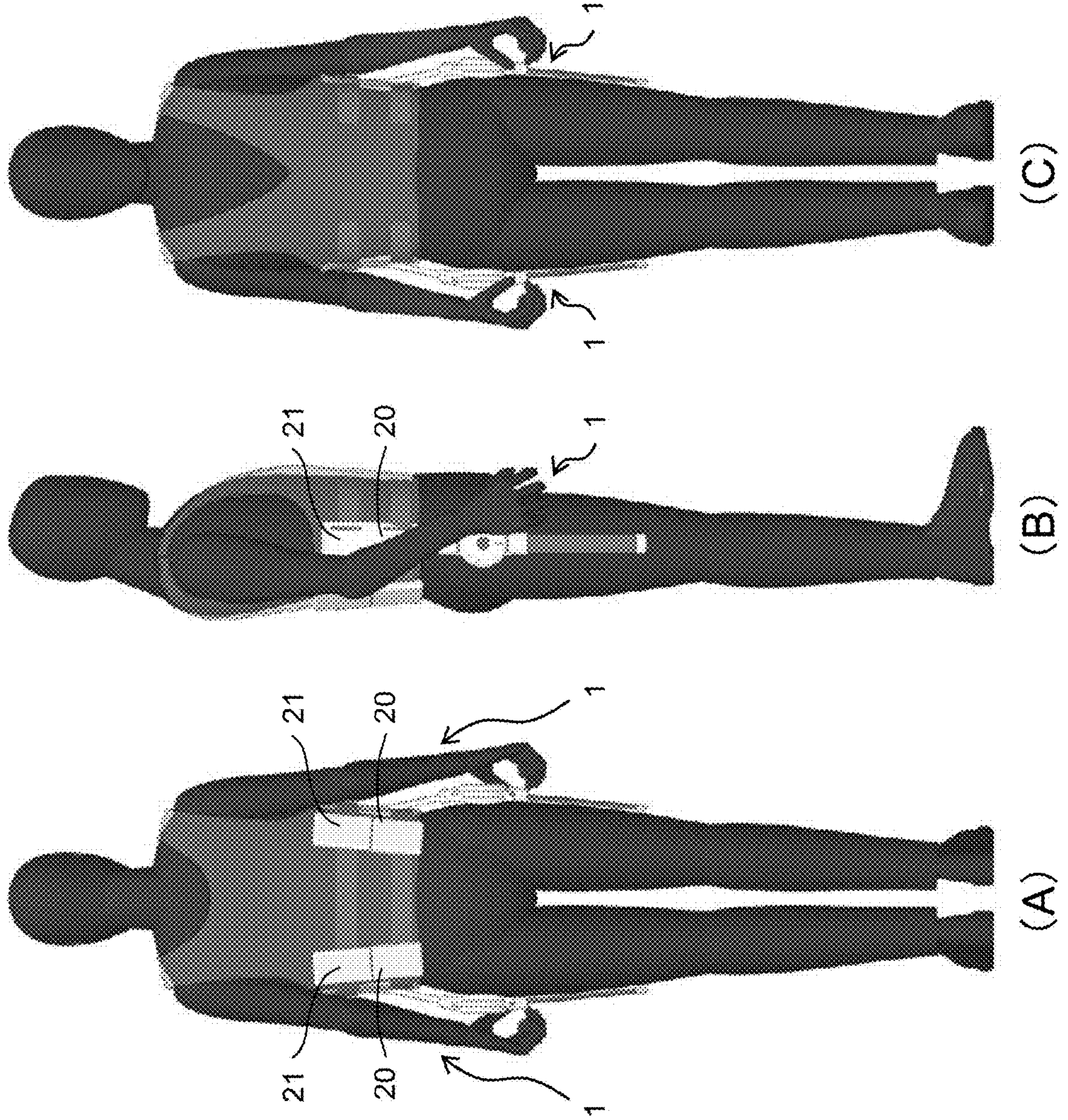
FIG. 22 is an external configuration diagram illustrating a state where the communication unit and the power source unit which are integrated together are added.

Moreover, the communication unit 20 and the power source unit 21, which are integrated together in the wearable motion assistance device 60 according to the first embodiment, can be added and appended as necessary. For example, since the communication unit 20 and the power source unit 21 which are integrated together can perform contactless communication and power supply, it becomes possible to attach them at desired positions in the corset 65 (particularly, for example, on both sides of a lower-back back-face part which is a position that does not interfere with the wearer's motions) as illustrated in FIG. 22(A) to FIG. 22(C). Consequently, the battery capacity can be substantially increased and the duration of motions can be extended.

Figure 23:
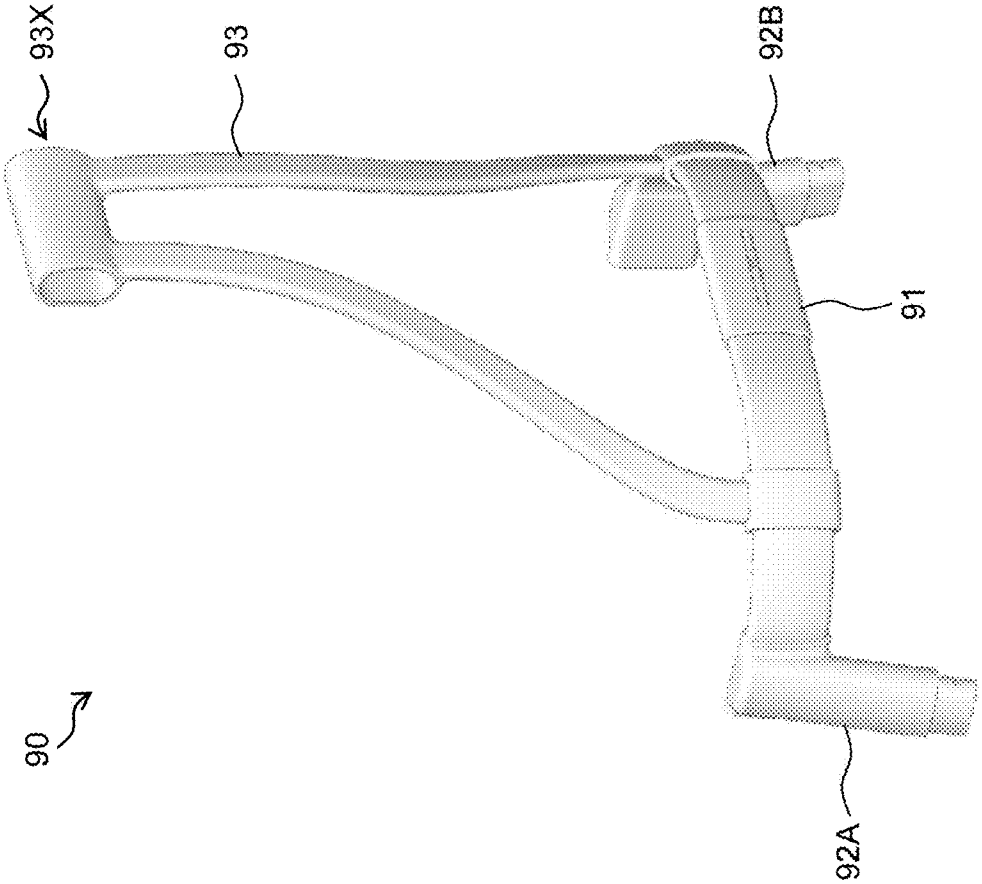
FIG. 23 is an external configuration diagram illustrating an upper-body-type frame unit for a wearable motion assistance device according to another embodiment.
Figure 24:
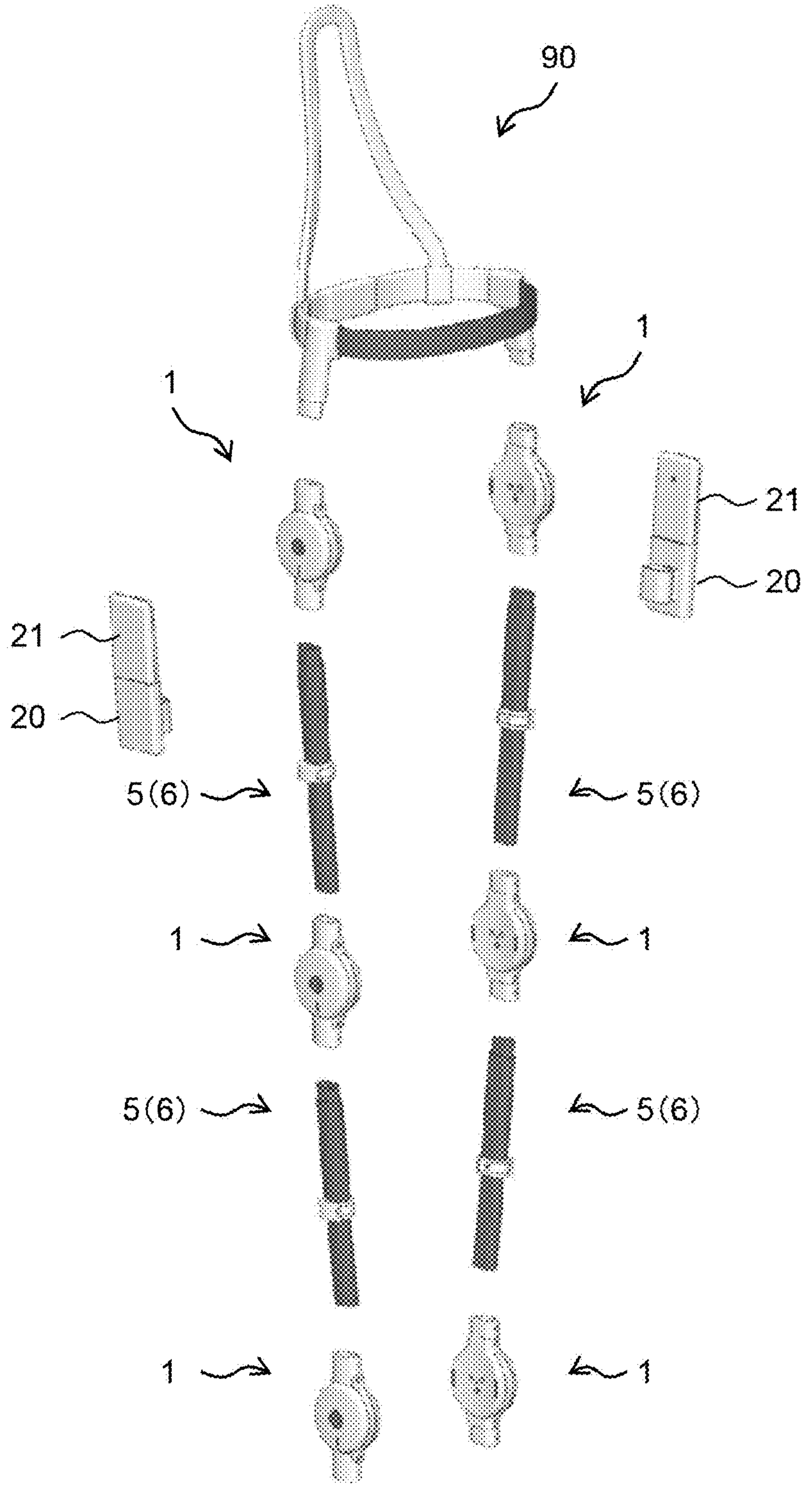
FIG. 24 is an exploded configuration diagram illustrating a combination of the wearable motion assistance devices according to the first and second embodiments.

For example, by applying an upper-body-type frame unit 90 as illustrated in FIG. 23 instead of the aforementioned frame unit 80 (FIG. 16), it becomes possible to perform a motion to assist joint sites at the wearer's upper limbs and lower back and also perform a motion to assist joint sites in their lower limbs with reference to the lower back.

This upper-body-type frame unit 90 is formed by integrating together: a lower back support 91 mounted on the wearer's lower back and designed to enter into contact with the wearer's back surface at their lower back; a pair of fixed holders 92A, 92B coupled to support a right end and a left end of the lower back support 91; and a back-part support 93 configured from a frame structure in a substantially isosceles triangle shape to support the wearer's back so that it extends upwards from its both sides between which a central part of the lower back support 91 is positioned. A coupling part 93X is formed in a horizonal direction at an upper end of this back-part support 93 so that it can be coupled to the coupling part 3 for the drive unit 2 in a freely attachable/detachable manner.

It becomes possible to support motions of joints at the wearer's lower back part and lower limbs by combining a plurality of wearable motion assistance devices 1 including this upper-body-type frame unit 90. For example, as illustrated in FIG. 24 and FIG. 25(A) to FIG. 25(C), one of the coupling parts 3 of the drive unit 2 for each wearable motion assistance device 1 is coupled to a pair of fixed holders 92A, 92B of the upper-body-type frame unit 90 to support the motions of the hip joint and one of the coupling parts 3 of the drive unit 2 for another wearable motion assistance device 1 is coupled to the other coupling part 3 of the above-mentioned drive unit 2 via the frame unit 5(6) to support the motions of the knee joint.

Furthermore, one of the coupling parts 3 of the drive unit 2 for another wearable motion assistance device 1 is coupled to the other coupling part 3 of the drive unit 2 of the above-mentioned wearable motion assistance device 1 via the frame unit 5(6) to support the motions of the ankle joint. The fixed holder formed on the outside of the heel at the aforementioned shoe 85 is coupled to the other coupling part 3 of the drive unit 2 for this wearable motion assistance device 1.

Under this circumstance, the frame unit 5(6) which couples together the drive unit 2 for supporting the motions of the hip joint and the drive unit 2 for supporting the motions of the knee joint, and the frame unit 5(6) which couples together the drive unit 2 for supporting the motions of the knee joint and the drive unit 2 for supporting the motions of the ankle joint can adjust the length between the wearer's hip joint and the knee joint and the length between the knee joint and the ankle joint, respectively.

Moreover, the communication unit 20 and the power source unit 21 which are integrated together can be attached to the frame unit 5(6), which couples together the drive unit 2 for supporting the motions of the hip joint and the drive unit 2 for supporting the motions of the knee joint, in a freely attachable/detachable manner. Furthermore, the communication unit 20 and the power source unit 21 which are integrated together may be attached to a desired frame unit 5(6) as necessary, for example, when it is desired to enhance the supply of the electric power to the drive unit 2.

Incidentally, although this is not illustrated in the drawing, a cuff(s) (which is not illustrated in the drawing) which is fixed and secured to a necessary site(s) of the frame unit 5(6) may be made to enter into contact with a body site(s) when supporting the motions of the wearer's hip joints, knee joints, and ankle joints, respectively.

As another embodiment in which a plurality of wearable motion assistance devices 1 including this upper-body-type frame unit 90 are combined together, it becomes possible to support the motions of the shoulder joints and elbow joints in the wearer's upper body as illustrated in FIG. 26(A) to FIG. 26(D).

Specifically speaking, one of the coupling parts 3 of the drive unit for the wearable motion assistance device 1 is coupled to the coupling part 93X at the upper end of the back-part support 93 in the upper-body-type frame unit 90 to support motions of the shoulder joint in a frontal plane direction and one of the coupling parts 3 of the drive unit 2 for the wearable motion assistance device 1 is coupled to the other coupling part 3 of the above-mentioned drive unit 2 to support the motions of the shoulder joint in a sagittal plane direction.

Furthermore, one of the coupling parts 3 of the drive unit 2 for the wearable motion assistance device 1 is coupled via the frame unit 5(6) to the other coupling part 3 of the drive unit 2 for the above-mentioned wearable motion assistance device 1 to support the motions of the elbow joint. The frame unit 5(6) to which a cuff to be wrapped around a wrist is secured and fixed is coupled to the other coupling part 3 of the drive unit 2 for this wearable motion assistance device 1.

Under this circumstance, the frame unit 5(6) for coupling together the drive unit 2 for supporting the motions of the shoulder join in the frontal plane direction and the drive unit 2 for supporting the motions of the shoulder joint in the sagittal plane direction, and the frame unit 5(6) for coupling together the drive unit 2 for supporting the motions of the shoulder joint in the sagittal plane direction and the drive unit 2 for supporting the motions of the elbow joint can adjust the length of the wearer's shoulder width, the length between the shoulder joint and the elbow joint, and the length between the elbow joint and the wrist.

Moreover, the communication unit 20 and the power source unit 21 which are integrated together can be attached to the frame unit 5(6), which couples together the drive unit 2 for supporting the motions of the shoulder joint in the sagittal plane direction and the drive unit 2 for supporting the motions of the elbow joint, in a freely attachable/detachable manner.

Furthermore, as illustrated in FIG. 27(A) to FIG. 27(C) and FIG. 28(A) and FIG. 28(B), it becomes possible to support motions of various kinds of joints in the wearer's upper limbs and lower limbs as another embodiment in which a plurality of wearable motion assistance devices 1 including the upper-body-type frame unit 90 are combined together.

Figure 25:
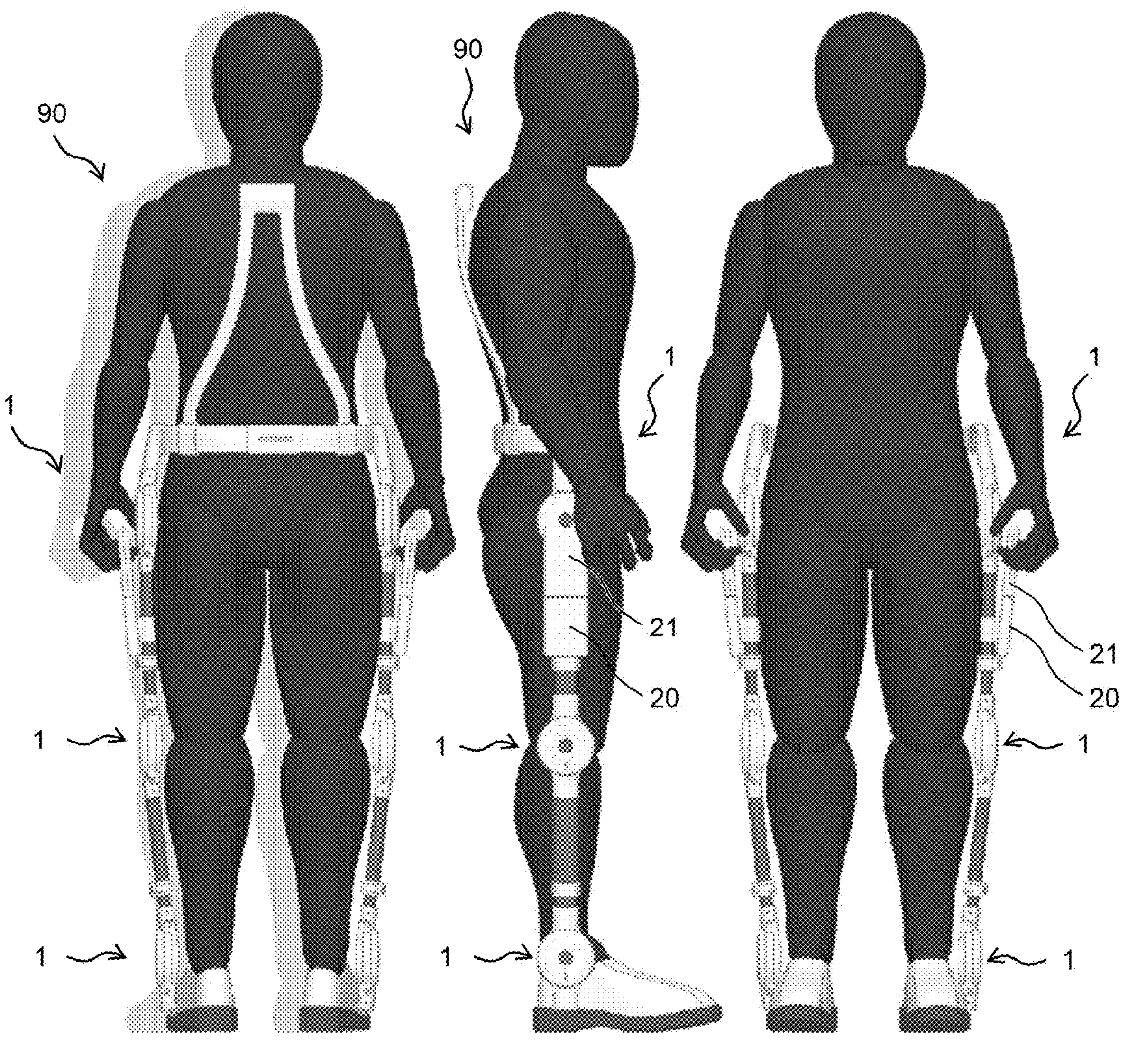
FIG. 25 is a schematic diagram illustrating a state of the wearer wearing a device composed of the combination shown in FIG. 24.
Figure 26:
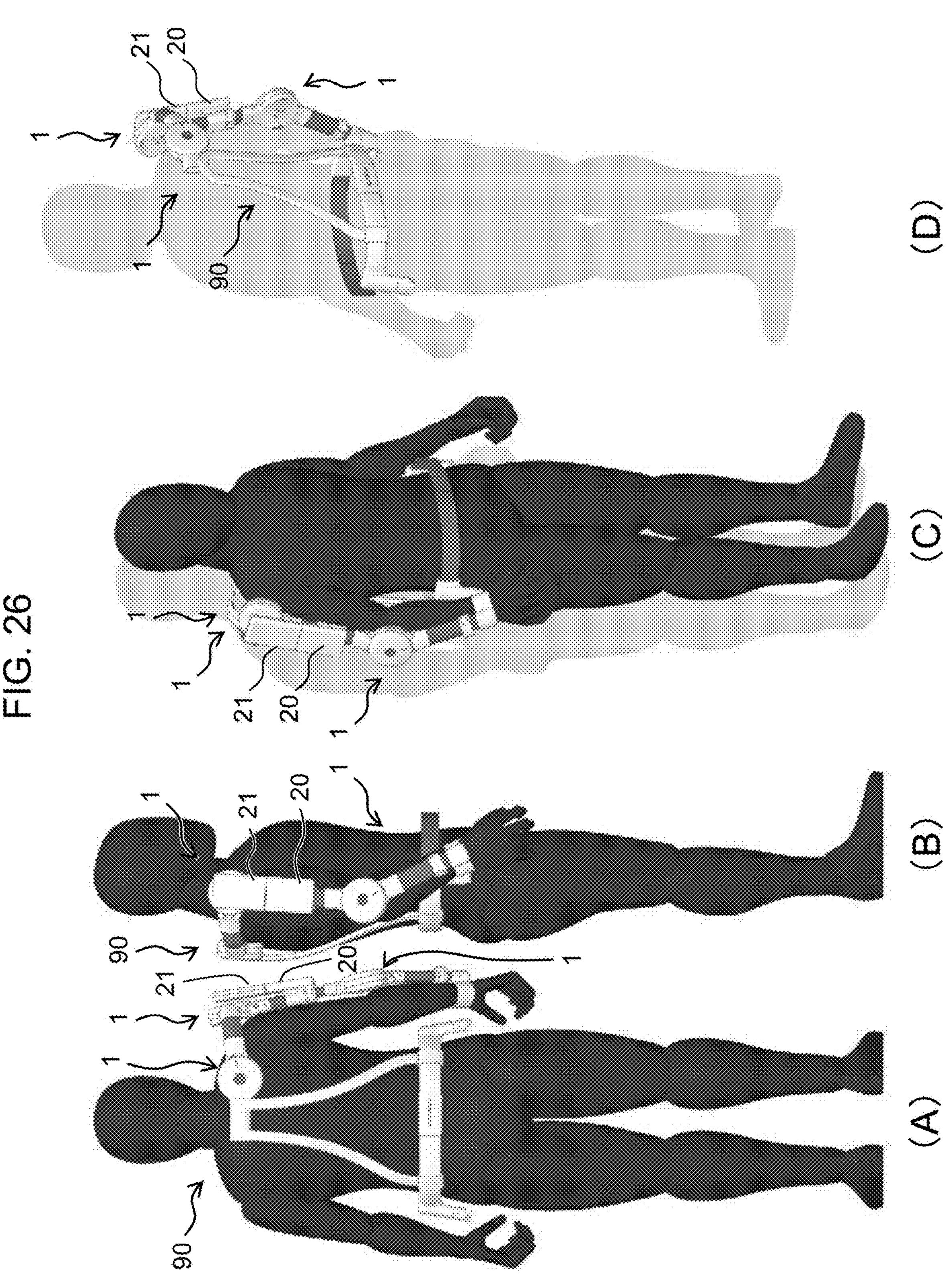
FIG. 26 is a schematic diagram illustrating an application example of the combination of the wearable motion assistance devices according to the first and second embodiments.
Figure 27:
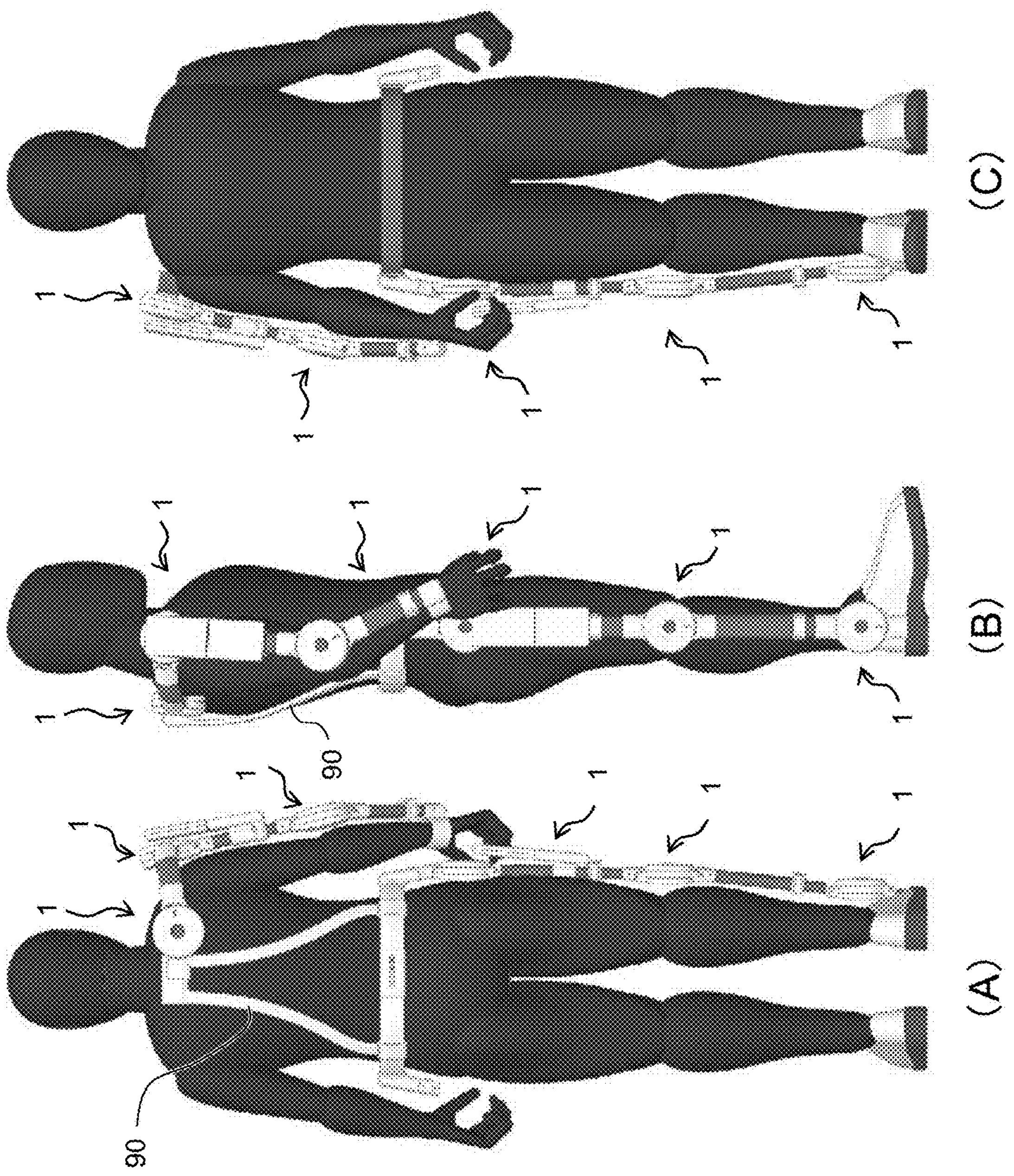
FIG. 27 is a schematic diagram illustrating an application example of the combination of the wearable motion assistance devices according to the first and second embodiments.
Figure 28:
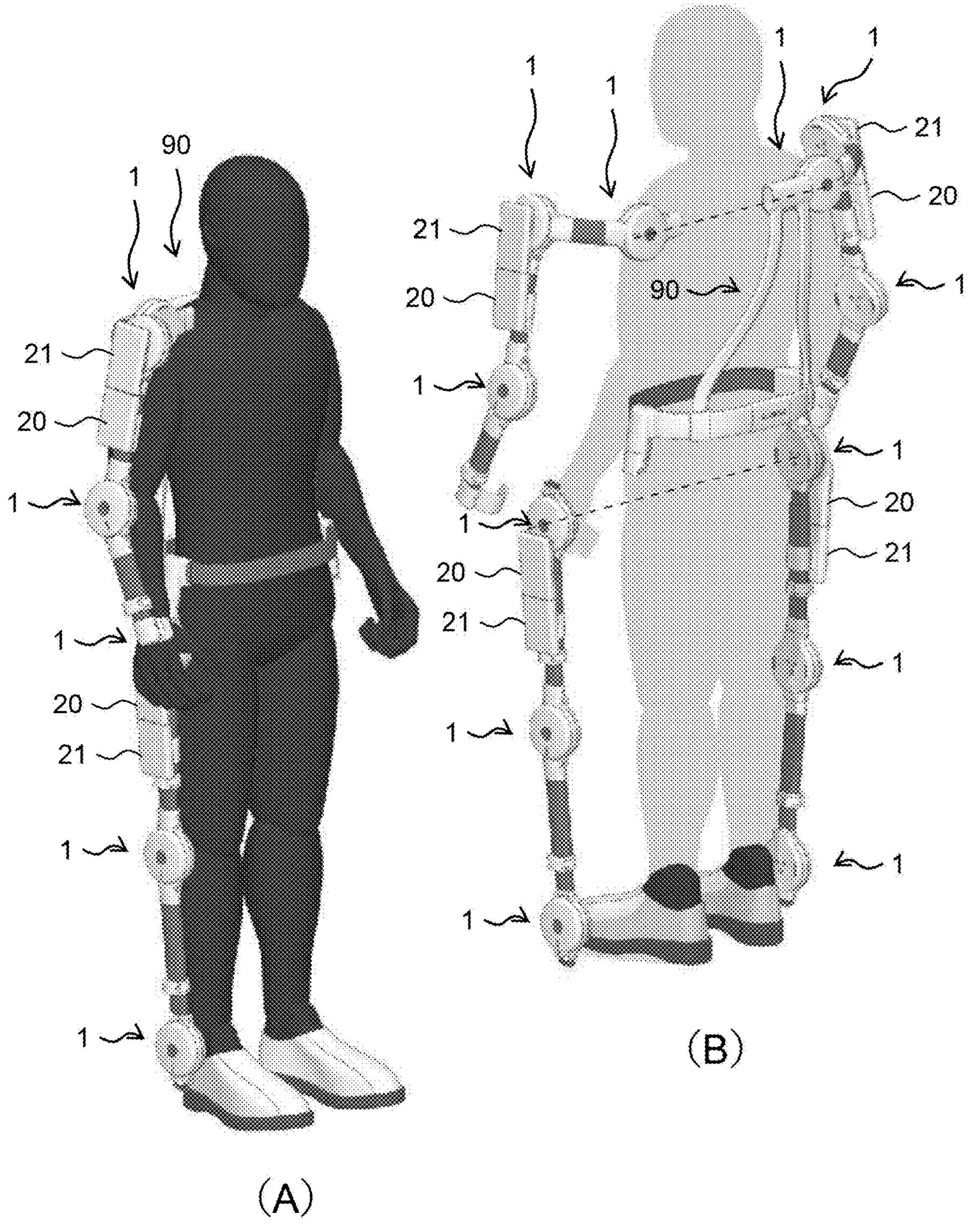
FIG. 28 is a schematic diagram illustrating an application example of the combination of the wearable motion assistance devices according to the first and second embodiments.

Specifically speaking, by further fusing together the combination of the plurality of wearable motion assistance devices 1 for the lower body (the lower limbs) as illustrated in FIG. 25(A) to FIG. 25(C) described earlier and the combination of the plurality of wearable motion assistance devices 1 for the upper body (the upper limbs) as illustrated in FIG. 26(A) to FIG. 26(D) described earlier, it becomes possible to support the motions of the various kinds of joints in the wearer's upper limbs and lower limbs. This fused combination is designed to support the entire device with reference to the wearer's lower back part by using the upper-body-type frame unit 90.

(6) Other Embodiments

Incidentally, the aforementioned first and second embodiments have described the case where the frame unit having the shape and structure as illustrated in FIG. 23 is applied as the upper-body-type frame unit 90; however, the present invention is not limited to this example and those having various shapes and structures may be applied according to the content of the combination of the plurality of the wearable motion assistance devices 1, 50, 60, 70 by positioning the devices at a desired joint site(s) in the wearer's body.

Figure 29:
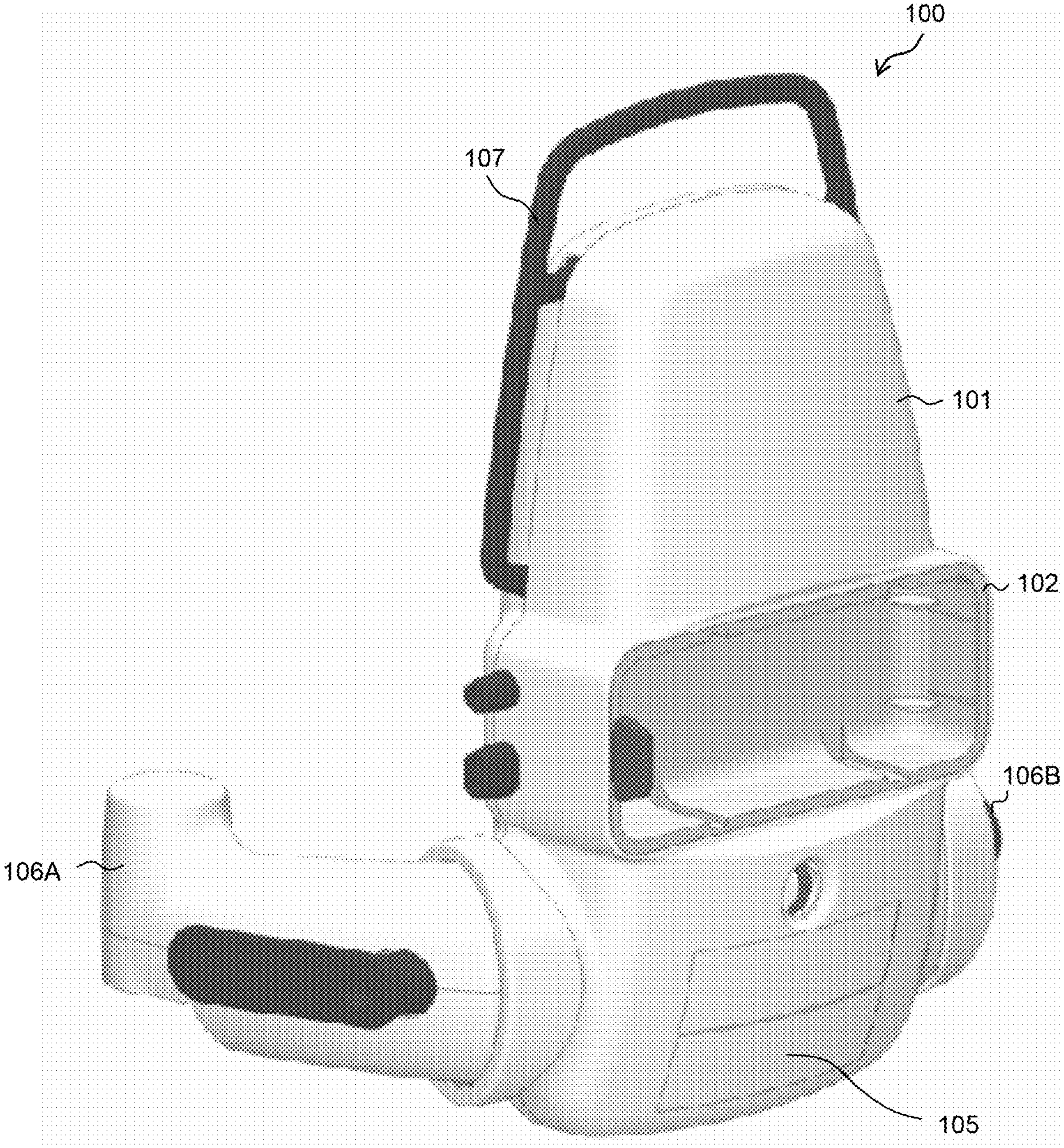
FIG. 29 is an external configuration diagram illustrating a variation of an upper-body-type frame unit for a wearable motion assistance device according to another embodiment.
Figure 30:
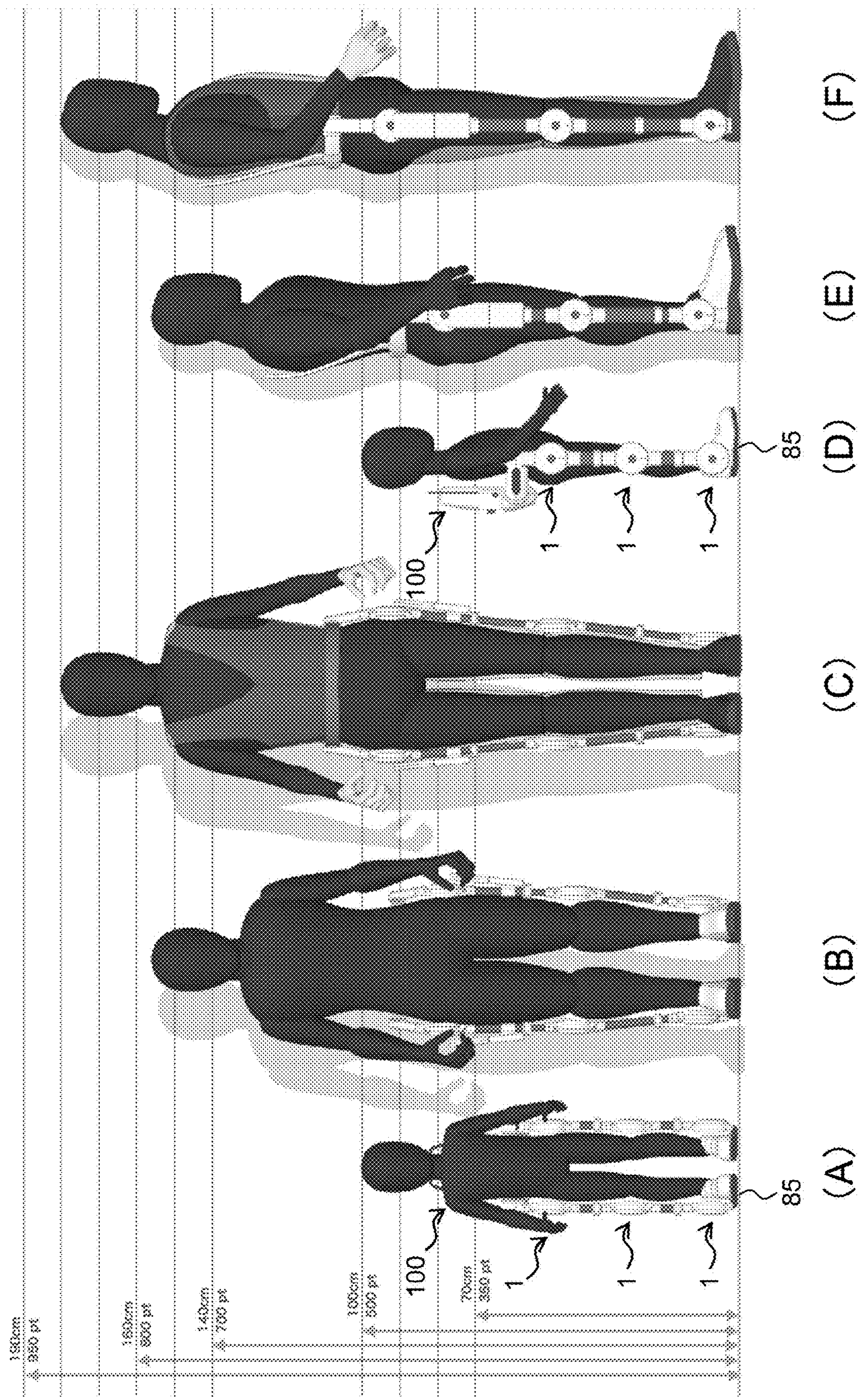
FIG. 30 is a schematic diagram illustrating an application example of a combination of a plurality of wearable motion assistance devices when the wearer's body size is very small.

For example, an upper-body-type frame unit 100 as illustrated in FIG. 29 is configured by integrating together a communication unit 101 and a power source unit 102 in predetermined shapes (no battery is illustrated in the drawing) in addition to the upper-body-type frame unit 90 illustrated in FIG. 23 described earlier.

Specifically speaking, the upper-body-type frame unit 100 illustrated in FIG. 29 is formed by integrating together: a lower back support 105 mounted on the wearer's lower back and designed to enter into contact with the wearer's back surface at their lower back; a pair of fixed holders 106A, 106B coupled to support a right end and a left end of the lower back support 105; a power source unit 102 in which a central part of the lower back support 105 is provided in its upper side; a communication unit 101 provided in an upper side of the power source unit 102; and a back support frame 107 for supporting the wearer's back so that it extends upwards from the inside of the communication unit 101.

This upper-body-type frame unit 100 is very effective when, for example, the body size of the wearer is very small like that of an infant or a child. When the body size of the wearer is very small as illustrated in FIG. 30(A) to FIG. 30(F) (FIG. 30(A) and FIG. 30(D)), the combination of the plurality of the wearable motion assistance devices 1 cannot be applied unless the length of the frame unit 5(6) coupled to the drive unit 2 is made much shorter than that for an adult.

When the sufficient length of the frame unit 5(6) cannot be secured, the communication unit and the power source unit which are integrated together cannot be attached directly to the frame unit 5(6); and, therefore, by applying the upper-body-type frame unit 100, even the wearer whose body size is small can operate the device sufficiently for practical purposes by positioning the device at a desired joint site(s).

REFERENCE SIGNS LIST

1, 50, 60, 70: wearable motion assistance device
2, 51, 61: drive unit
5: first frame unit
6: second frame unit
20, 52, 62, 71: communication unit
21, 53, 63, 72: power source unit
10: actuator
11: actuator control unit
12: speed reducer
13: touch sensor
14: operating unit
30: voluntary control unit
31: autonomous control unit
32: phase specifying unit
33: gain control unit
34: integrated control unit
35: electric power amplification unit
36: actuator driver
37: command signal database
38: reference parameter database
39: data storage unit
40: motion-and-posture sensor
41: biosignal detection sensor
65: corset
66, 80, 86: frame unit
90, 100: upper-body-type frame unit

The invention claimed is:

1. A wearable motion assistance device comprising:

a drive unit having first and second housings in which a stator side and a rotor side of a flat-shaped actuator are respectively housed and which engage with each other so that the first and second housings rotate separately according to a driving of the actuator, wherein coupling parts of a same structure are formed to protrude from the first and second housings respectively in mutually opposite directions, wherein a main body of a speed reducer which converts a rotational speed of a rotor for the actuator into a specified speed reduction ratio and outputs the converted rotational speed, and an actuator driver which performs drive control of the actuator are housed in either one of the first or second housings to be substantially flush with each other, and a flat-shaped operating unit including a touch sensor is fixed to the main body of the speed reducer so that the actuator is located between the main body of the speed reducer and the operating unit, and an output axis of the speed reducer is fixed to the other one of the first or second housings;

first and second frame units that are respectively coupled to the respective coupling parts of the drive unit in a separable manner;

a power source unit that engages with the first or second frame unit in a freely attachable/detachable manner and is equipped with a battery for supplying electric power to the actuator;

a control unit provided in the drive unit and designed to perform drive control of the actuator;

a physical quantity detector that detects a physical quantity regarding a rotary motion between the first and second housings from a driving current supplied to the actuator;

a biosignal detection unit that detects a biosignal according to movements of a joint connecting first and second body sites of a wearer; and a data storage unit that stores a reference parameter of each phase, which is a sequence of minimum motion units that constitute a motion pattern of the wearer classified as a task, wherein in a state where the drive unit is located on a lateral side of the wearer's joint and the first and second frame units are fixed and retained corresponding to the wearer's first and second body sites, respectively, the control unit:

estimates the wearer's task and phase on a basis of the reference parameter stored in the data storage unit while performing drive control to cause the actuator to generate motive power in accordance with the wearer's intention on the basis of the biosignal detected by the biosignal detection unit, and adjusts the drive control to cause the actuator to generate motive power according to the phase; and compensates for mechanical impedance of a control object of an entire system composed of the entire device and the wearer on the basis of the physical quantity detected by the physical quantity detector and in accordance with viscoelasticity of the wearer and gravity of the control object of the entire system.

2. The wearable motion assistance device according to claim 1, wherein the physical quantity detector detects an absolute angle, a rotation angle, an angular velocity, angular acceleration, and a driving torque between the first and second housings as the physical quantity regarding the rotary motion between the first and second housings.

3. The wearable motion assistance device according to claim 1, wherein each of the coupling parts of the drive unit has a rotary shaft along a direction vertical to an output axis of the speed reducer and the first and second frame units are coupled to the drive unit so as to be freely rotatable about the rotary shaft of each corresponding coupling part.

4. The wearable motion assistance device according to claim 1, wherein each of the first and second frame units and the power source unit is formed so that a thickness of its housing is thinner than a thickness of the first and second housings which constitute the drive unit and engage with each other.

5. The wearable motion assistance device according to claim 1, wherein either one or both of the first and second frame units can be adjusted in a freely expandable and contractible manner in a direction of the coupling to the coupling part.

6. A wearable motion assistance device comprising:

a drive unit having first and second housings in which a stator side and a rotor side of a flat-shaped actuator are respectively housed and which engage with each other so that the first and second housings rotate separately according to a driving of the actuator, wherein first and second coupling parts are formed to protrude from the first and second housings respectively in mutually opposite directions, wherein a main body of a speed reducer which converts a rotational speed of a rotor for the actuator into a specified speed reduction ratio and outputs the converted rotational speed, and an actuator driver which performs drive control of the actuator are housed in either one of the first or second housings to be substantially flush with each other, and a flat-shaped operating unit including a touch sensor is fixed to the main body of the speed reducer so that the actuator is located between the main body of the speed reducer and the operating unit, and an output axis of the speed reducer is fixed to the other one of the first or second housings;

a frame unit that is coupled to the first coupling part of the drive unit in a separable manner;

a power source unit that is coupled to the second coupling part of the drive unit and is equipped with a battery for supplying electric power to the actuator;

a control unit provided in the drive unit and designed to perform drive control of the actuator;

a physical quantity detector that detects a physical quantity regarding a rotary motion between the first and second housings from a driving current supplied to the actuator;

a biosignal detection unit that detects a biosignal according to movements of a joint connecting first and second body sites of a wearer; and a data storage unit that stores a reference parameter of each phase, which is a sequence of minimum motion units that constitute a motion pattern of the wearer classified as a task, wherein, in a state where the drive unit is located on a lateral side of the wearer's joint and the power source and the frame unit are fixed and retained corresponding to the wearer's first and second body sites, respectively, the control unit:

estimates the wearer's task and phase on a basis of the reference parameter stored in the data storage unit while performing drive control to cause the actuator to generate motive power in accordance with the wearer's intention on the basis of the biosignal detected by the biosignal detection unit, and adjusts the drive control to cause the actuator to generate motive power according to the phase; and compensates for mechanical impedance of a control object of an entire system composed of the entire device and the wearer on the basis of the physical quantity detected by the physical quantity detector and in accordance with viscoelasticity of the wearer and gravity of the control object of the entire system.

7. The wearable motion assistance device according to claim 6, wherein the physical quantity detector detects an absolute angle, a rotation angle, an angular velocity, angular acceleration, and a driving torque between the first and second housings as the physical quantity regarding the rotary motion between the first and second housings.

8. The wearable motion assistance device according to claim 6, wherein the first and second coupling parts of the drive unit have rotary shafts along a direction vertical to an output axis of the speed reducer and the frame unit and the power source are coupled to the drive unit so as to be freely rotatable about the rotary shafts of the first and second coupling parts.

9. The wearable motion assistance device according to claim 6, wherein each of the frame unit and the power source unit is formed so that a thickness of its housing is thinner than a thickness of the first and second housings which constitute the drive unit and engage with each other.

10. The wearable motion assistance device according to claim 6, wherein the frame unit can be adjusted in a freely expandable and contractible manner in a direction of the coupling to the coupling part.

11. The wearable motion assistance device according to claim 1, wherein the flat-shaped operating unit includes a touch panel that configures a housing surface and a power source button at a center of the housing, and wherein the operating unit is fixed to a main body of a speed reducer so that the actuator is located between the main body and the operating unit, and an MCM (Multi-Chip Module) equipped with a CPU and memory is built in an actuator control unit of the drive unit.

12. The wearable motion assistance device according to claim 1, wherein each of the first and second frame units includes connectors having a specified structure at one end and another end, the connectors being electrically connected to each other by a freely-flexible extender cable through an inside of the frame, and wherein a connector having a specified structure is built in each coupling part of the drive unit such that corresponding connectors engage with each other and are electrically connected when the first and second frame units are coupled to the drive unit.

13. The wearable motion assistance device according to claim 6, wherein the power source unit includes a communication unit having a housing in a predetermined shape and equipped with a communication function for transmitting and receiving data through connections via a near field communication method, wherein a fixed holder for securing and retaining the frame unit is formed to protrude from a lateral side of the communication unit housing, and wherein the communication unit is wire-connected with the drive unit to enable supply of electric power to the drive unit when engaging with the frame unit.

14. The wearable motion assistance device according to claim 1, wherein the control unit includes a voluntary control unit that generates a command signal by applying a specified command function or gain to the biosignal detection unit, wherein the gain is adjustable via a gain control unit according to content of operations of an operating unit, and wherein an autonomous control unit generates a command signal according to control data of a phase identified by a phase specifying unit and supplies the command signal to an electric power amplification unit for causing the actuator to generate motive power.

* * * * *